(12) United States Patent
Yamamoto et al.

(10) Patent No.: US 7,976,427 B2
(45) Date of Patent: Jul. 12, 2011

(54) VEHICLE CONTROL APPARATUS AND VEHICLE EQUIPPED WITH THE CONTROL APPARATUS

(75) Inventors: Daisuke Yamamoto, Hitachinaka (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 12/328,256

(22) Filed: Dec. 4, 2008

(65) Prior Publication Data
US 2009/0149295 A1 Jun. 11, 2009

(30) Foreign Application Priority Data
Dec. 6, 2007 (JP) ................................. 2007-316412

(51) Int. Cl.
*B60W 10/08* (2006.01)
(52) U.S. Cl. ........................................................... 477/4
(58) Field of Classification Search .......... 477/4; 903/947
See application file for complete search history.

(56) References Cited

U.S. PATENT DOCUMENTS

| | | | | |
|---|---|---|---|---|
| 5,511,859 A | * | 4/1996 | Kade et al. ........................ 303/3 |
| 6,126,251 A | * | 10/2000 | Yoshii et al. ................. 303/152 |
| 6,155,365 A | * | 12/2000 | Boberg ..................... 180/65.25 |
| 6,617,703 B2 | * | 9/2003 | Matsubara et al. ......... 290/40 C |
| 6,910,747 B2 | * | 6/2005 | Tsunehara ..................... 303/152 |
| 7,469,178 B2 | * | 12/2008 | Shiiba et al. ..................... 701/70 |
| 7,561,954 B2 | * | 7/2009 | Aizawa et al. .................. 701/79 |
| 2008/0106227 A1 | | 5/2008 | Gebert et al. |

FOREIGN PATENT DOCUMENTS

| | | |
|---|---|---|
| DE | 10 2005 032 196 A1 | 1/2007 |
| EP | 1 717 491 A1 | 11/2006 |
| JP | 8-251708 A | 9/1996 |
| JP | 10-73161 A | 3/1998 |
| JP | 2006-151018 | 6/2006 |

OTHER PUBLICATIONS

European Search Report dated Jul. 6, 2009 English language (Seven (7) pages).

* cited by examiner

*Primary Examiner* — Dirk Wright
(74) *Attorney, Agent, or Firm* — Crowell & Moring LLP

(57) ABSTRACT

This invention provides a vehicle control apparatus constructed so that during the control of a downshift for deceleration, braking shocks can be reduced and the amount of energy regenerated can be increased, and a hybrid vehicle equipped with the control apparatus.

The hybrid vehicle 1 includes wheels 14, an engine 12, a motor 11, a multi-stage transmission 20 that reduces motor torque and transmits the reduced torque to the wheels, and a brake 15 that brakes the wheels. During deceleration downshift control, a hybrid control module 100 provides distribution control of the regenerative torque of the motor 11 and the braking torque of the brake 15 so that the total braking force of the vehicle during gear shifting matches a target value.

12 Claims, 16 Drawing Sheets

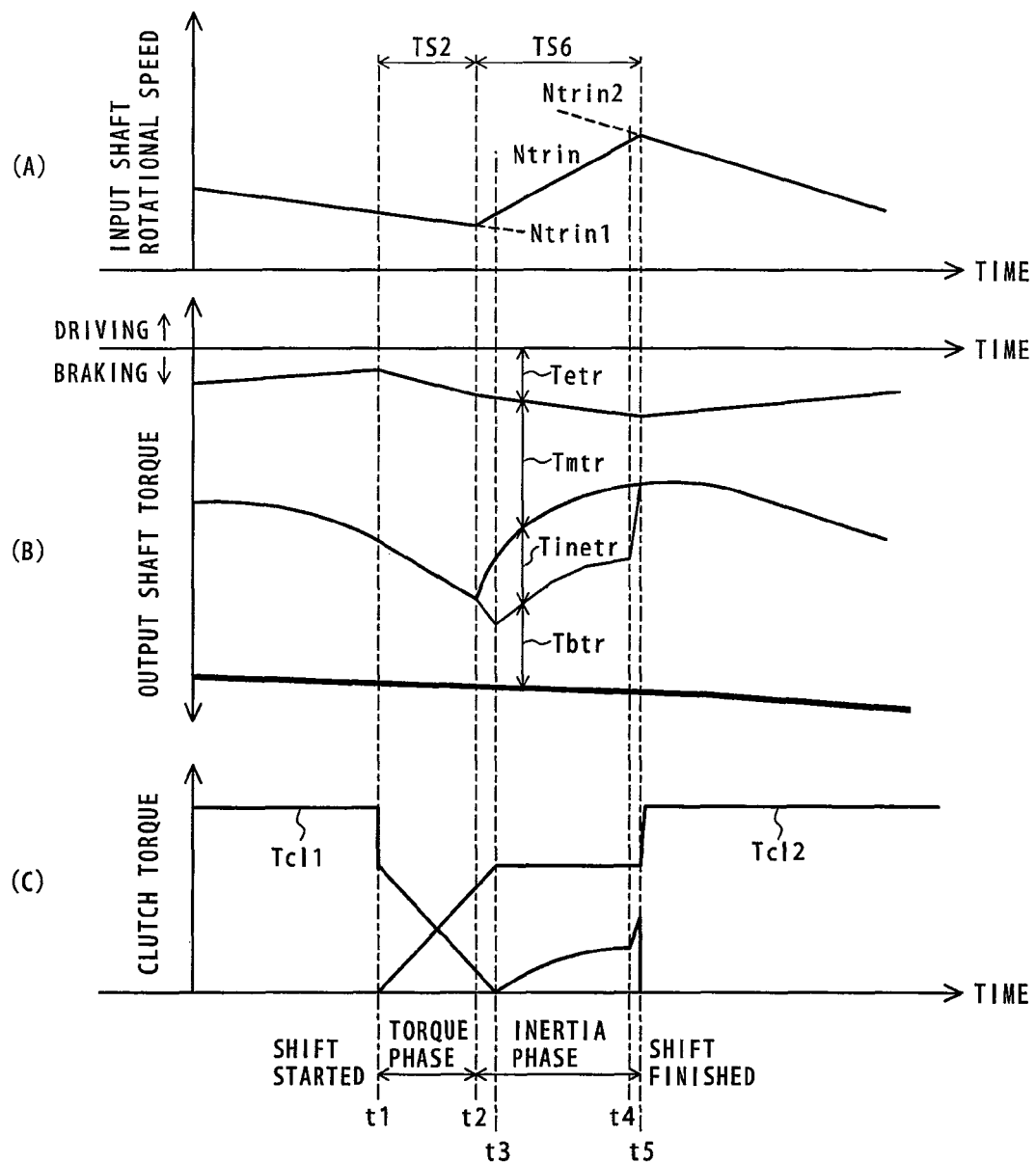

VEHICLE CONTROL APPARATUS AND VEHICLE EQUIPPED WITH THE CONTROL APPARATUS

BACKGROUND OF THE INVENTION

1. Field of the Invention

The present invention relates generally to vehicle control apparatus and to motor vehicles equipped with a vehicle control apparatus. More particularly, the invention concerns a vehicle control apparatus suitable for downshift control during deceleration of a motor vehicle including a motor and a brake as braking sources for the vehicle and using a multi-stage transmission on a torque-transmitting route of the motor.

2. Description of the Related Art

A technique for inhibiting a downshift during deceleration in order to raise energy-regenerating efficiency is known as a method of controlling a downshift during deceleration of a hybrid automobile equipped with a multi-stage transmission. JP-A-10-73161, for example, describes such a technique. Also known is a technique intended to prevent the occurrence of a driving force during the downshift of a vehicle by controlling the total of a motor regenerative torque and an engine brake torque so as not to exceed an engine friction torque during gear shifting. JP-A-2006-151018, for example, describes such a technique.

SUMMARY OF THE INVENTION

As described in JP-A-10-73161, however, the inhibition of the downshift means that after the vehicle has slowed down to a certain degree, when the driver changes the position of the foot from the brake pedal to the accelerator pedal, the acceleration requested by the driver will be unattainable since the high-speed gear position that has been used up until the start of the slowdown will still be maintained. To accelerate the vehicle, therefore, the driver will need first to perform a downshift, which will deteriorate acceleration response characteristics.

Solving this problem requires shifting gears during regenerative braking as well. Shifting gears during regenerative braking, however, causes such a trade-off problem between the amount of energy regenerated and the magnitude of a braking shock that whereas maximizing the amount of energy regenerated augments the braking shock to its maximum, minimizing the braking shock minimizes the amount of energy regenerated.

Shifting gears in a multi-stage transmission usually progresses with a torque phase first and then an inertia phase. The torque phase is a process in which the output torque of the transmission changes. The inertia phase is a process in which the input shaft rotational speed of the transmission changes. In the multi-stage transmission, since the on-shaft torque ratio and shaft rotational speed ratio of the transmission input shaft change in different timing, the torque ratio and speed ratio obtained under the shift state, unlike those of a non-shift state, take different values. In the torque phase, an increase in the torque ratio causes a braking shock. In the inertia phase, an inertia torque causes a braking shock.

Meanwhile, as described in JP-A-2006-151018, reducing a regenerative torque for minimum braking shock causes the problems that the energy needed to compensate for an increase in the torque ratio and for the inertia torque is not regenerated and hence that the amount of regeneration obtained will naturally decrease.

In particular, using a larger motor correspondingly increases the regenerative torque, thus causing the above problems to easily occur.

An object of the present invention is to provide: a vehicle control apparatus adapted to increase the amount of energy regenerated, as well as to reduce braking shocks, during downshift control for deceleration; and a motor vehicle equipped with the control apparatus.

(1) In order to achieve the above object, the present invention provides, as an aspect thereof, a vehicle control apparatus for a motor vehicle which includes wheels, a motor, a brake, and a multi-stage transmission, and which is designed to transmit a torque of the motor to the wheels via the multi-stage transmission. This vehicle control apparatus adapted to control a braking force of the vehicle by using a braking torque of the motor and a braking force of the brake comprises gear shift control means that performs a gear shift of the multi-stage transmission according to a particular state of the vehicle, and torque distribution control means that controls distribution of the braking torques of the motor and the brake. This construction allows the vehicle control apparatus to reduce a braking shock when controlling a downshift for deceleration, and to increase the amount of energy regenerated during the control of the downshift.

(2) In above item (1), during a torque phase of the downshift, even when the motor develops a maximum achievable braking torque, when the target braking force of the vehicle is judged to be achievable, the control of the torque distribution preferably changes the braking torque of the brake according to a particular change in the motor braking torque expressed in transmission output shaft torque, in order that a total braking force of the vehicle matches the target braking force thereof.

(3) In above item (1), preferably, the vehicle further includes an engine and transmits a torque of the engine to the wheels via the multi-stage transmission, and the vehicle control apparatus is constructed such that during a torque phase of the downshift, even when the motor develops a maximum achievable braking torque, when the target braking force of the vehicle is judged to be achievable, the control of the torque distribution changes the braking torque of the brake according to particular changes in the engine brake torque and motor braking torque which are expressed in transmission output shaft torque, in order that a total braking force of the vehicle matches the target braking force thereof.

(4) In above item (1), during a torque phase of the downshift, when the motor develops a maximum achievable braking torque and the target braking force of the vehicle is judged to be unachievable, the control of the torque distribution is preferably adapted to minimize the braking torque of the brake and to change the braking torque of the motor such that a total braking force of the vehicle matches the target braking force thereof.

(5) In above item (1), preferably, the vehicle further includes an engine and transmits a torque of the engine to the wheels via the multi-stage transmission, and the vehicle control apparatus is constructed such that during a torque phase of the downshift, when the motor develops a maximum achievable braking torque and the target braking force of the vehicle is judged to be unachievable, the control of the torque distribution is adapted to minimize the braking torque of the brake and to change the braking torque of the motor according to a particular change in a brake torque of the engine such that a total braking force of the vehicle matches the target braking force thereof.

(6) In above item (1), during an inertia phase of the downshift, even when the motor develops a maximum achievable braking torque, when the target braking force of the vehicle is judged to be achievable, the control of the torque distribution preferably changes the braking torque of the brake according to a change in inertia torque that is caused by a change in motor rotational speed as well as a particular change in the motor braking torque that is expressed in transmission output shaft torque, in order that a total braking force of the vehicle matches the target braking force thereof.

(7) In above item (1), preferably, the vehicle further includes an engine and transmits a torque of the engine to the wheels via the multi-stage transmission, and the vehicle control apparatus is constructed such that during an inertia phase of the downshift, even when the motor develops a maximum achievable braking torque, when the target braking force of the vehicle is judged to be achievable, the control of the torque distribution changes the braking torque of the brake according to a change in inertia torque which is caused by a change in motor rotational speed, as well as particular changes in the engine brake torque and motor braking torque which are expressed in transmission output shaft torque, in order that a total braking force of the vehicle matches the target braking force thereof.

(8) In above item (1), during an inertia phase of the downshift, even when the motor develops a maximum achievable braking torque, when the target braking force of the vehicle is judged to be achievable, the control of the torque distribution is preferably adapted to minimize the braking torque of the motor and to change the braking torque of the motor according to a change in inertia torque which is caused by a change in motor rotational speed, in order that a total braking force of the vehicle matches the target braking force thereof.

(9) In above item (1), preferably, the vehicle further includes an engine and transmits a torque of the engine to the wheels via the multi-stage transmission, and the vehicle control apparatus is constructed such that during an inertia phase of the downshift, even when the motor develops a maximum achievable braking torque, when the target braking force of the vehicle is judged to be achievable, the control of the torque distribution is adapted to minimize the braking torque of the brake and to change the braking torque of the motor according to a change in inertia torque that is caused by a change in motor rotational speed as well as particular changes in the engine brake torque, in order that a total braking force of the vehicle matches the target braking force thereof.

(10) In above item (1), during an inertia phase of the downshift, even when the motor develops a maximum achievable braking torque, when the target braking force of the vehicle is judged to be achievable and the maximum achievable braking torque is power-limited, the control of the torque distribution is preferably adapted to control a clutch-engaging force (torque capacity) of a clutch within the multi-stage transmission according to a particular decrease in the braking torque of the motor due to the power limit, and to change the braking torque of the brake according to a change in inertia torque that is caused by a change in motor rotational speed as well as a particular change in the motor braking torque that is expressed in transmission output shaft torque, in order that a total braking force of the vehicle matches the target braking force thereof.

(11) In above item (1), preferably, the vehicle further includes an engine and transmits a torque of the engine to the wheels via the multi-stage transmission, and the vehicle control apparatus is constructed such that during an inertia phase of the downshift, even when the motor develops a maximum achievable braking torque, when the target braking force of the vehicle is judged to be achievable and the maximum achievable braking torque is power-limited, the control of the torque distribution is adapted to control a clutch-engaging force (torque capacity) of a clutch within the multi-stage transmission according to a particular decrease in the braking torque of the motor due to the power limit, and to change the braking torque of the brake according to a change in inertia torque that is caused by a change in motor rotational speed as well as a particular change in the engine brake torque and motor braking torque which are expressed in transmission output shaft torque, in order that a total braking force of the vehicle matches the target braking force thereof.

(12) In order to achieve the above object, the present invention provides, as another aspect thereof, a motor vehicle comprising, in addition to wheels, a brake, a multi-stage transmission, and a motor connecting to the wheels via the multi-stage transmission, a vehicle control apparatus which controls a braking force of the vehicle by using a braking torque of the motor and a braking torque of the brake, the vehicle control apparatus being adapted to include gear shift control means that performs a gear shift of the multi-stage transmission according to a particular state of the vehicle, and torque distribution control means that controls distribution of the braking torques of the motor and the brake; wherein, when downshift control is selected by the gear shift control means, the distribution of the torques is controlled to obtain a target braking force of the vehicle that is determined by the state of the vehicle and operations of a driver.

This construction allows the vehicle control apparatus to reduce a braking shock when controlling a downshift for deceleration, and to increase the amount of energy regenerated during the control of the downshift.

According to the present invention, during downshift control for deceleration, braking shocks can be reduced and the amount of energy regenerated can be increased.

BRIEF DESCRIPTION OF THE DRAWINGS

FIG. 17 is a timing chart that shows details of control in inertia phase process 3 by the vehicle control apparatus of the present embodiment.

DESCRIPTION OF THE PREFERRED EMBODIMENTS

Hereunder, a configuration and operation of a vehicle control apparatus according to an embodiment of the present invention will be described using FIGS. 1 to 17. A configuration of hybrid vehicle with the vehicle control apparatus according to the present embodiment is first described using FIG. 1.

Figure 1:
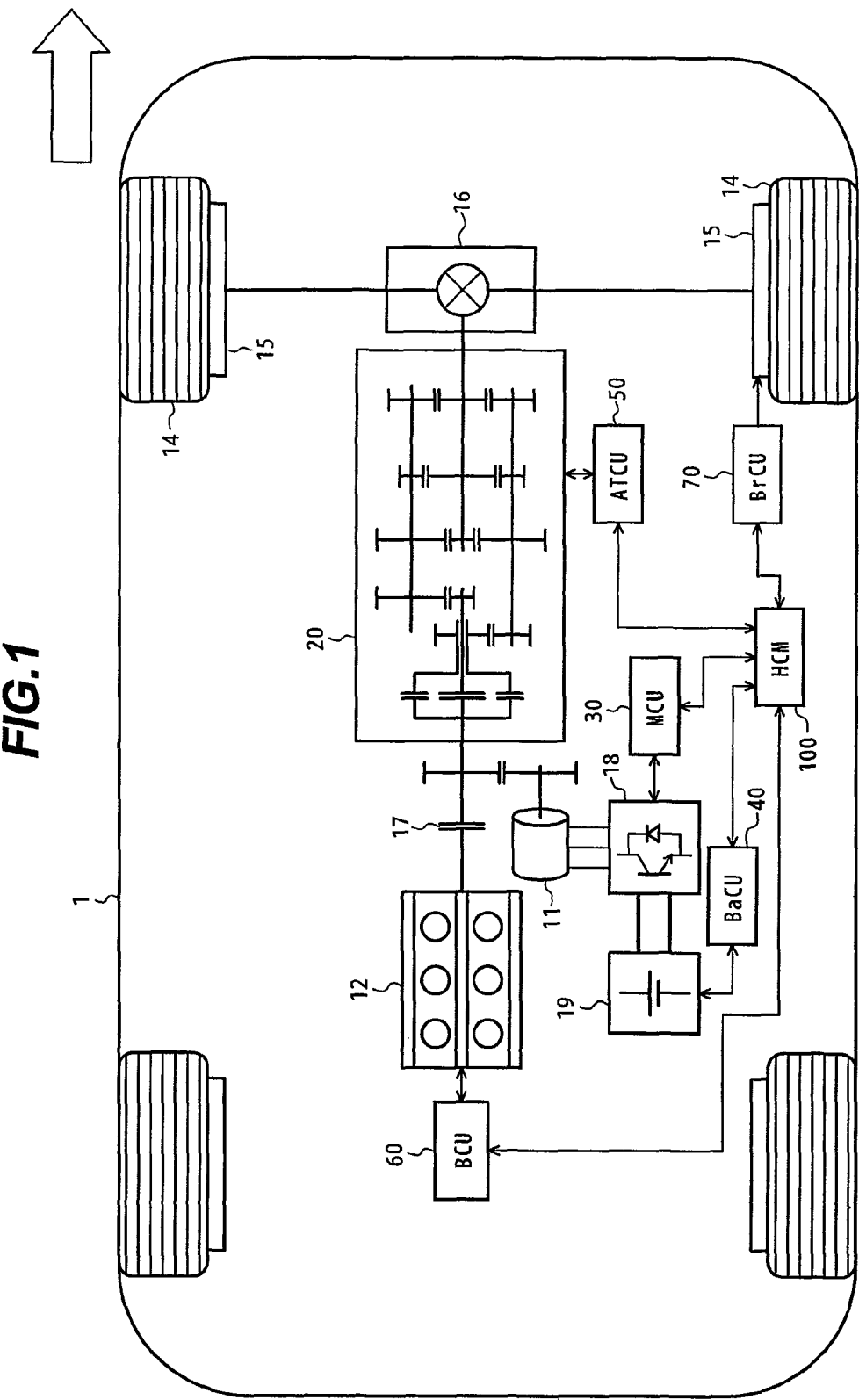
FIG. 1 is a system block diagram showing a configuration of a hybrid vehicle equipped with a vehicle control apparatus according to an embodiment of the present invention.

FIG. 1 is a system block diagram showing the configuration of the hybrid vehicle equipped with the vehicle control apparatus according to the present embodiment.

The hybrid vehicle 1 has a motor 11 as a braking and driving source. The motor 11 is a three-phase AC synchronous motor, for example. The motor 11 can generate a braking force and a driving force by exchanging electrical energy with a battery 19 via an inverter 18. The synchronous motor can be replaced by any other motor such as an induction motor or a DC motor with brushes.

A motor control apparatus (MCU) 30 controls a driving torque of the motor 11 by controlling the inverter 18 and making variable an armature current supplied to an armature coil of the motor 11. When the motor 11 is driven by wheels 14 and an engine 12 and is generating electrical energy, the MCU 30 also controls the inverter 18 to transform AC power into DC power and store the DC power into the battery 19.

A battery control apparatus (BaCU) 40 controls charge/discharge states of the battery 19. The BaCU 40 also monitors the state of charge (SOC) of the battery and notifies the battery charge state to a hybrid control module (HCM) 100.

A braking/driving torque that the motor 11 has generated is transmitted to the wheels 14 via a multi-stage transmission 20 and a differential unit 16. Except during a gearshifting operation, the multi-stage transmission 20 transmits an on-shaft torque and shaft rotational speed of an input shaft to an output shaft at a certain shift gear ratio. A detailed configuration of the transmission 20 will be described later herein using FIG. 2. The differential unit 16 is a device that employs differential gearing to distribute and transmit an input torque to front wheels, even when a difference in speed exists between two output ends. The multi-stage transmission 20 is an automated transmission in which gearshifting is automatically controlled by an actuator. An automated transmission control apparatus (ATCU) 50 controls shift gear ratios of the transmission 20.

The hybrid vehicle 1 includes an engine 12 as another braking and driving source. Usually, the engine 12 generates a driving force. Under an engine braking state, however, the engine 12 generates a braking force. A braking/driving torque that the engine 12 has generated is transmitted to the wheels 14 via a clutch 17, the multi-stage transmission 20, and the differential unit 16. Disengaging the clutch 17 completely disconnects the engine 12 from the multi-stage transmission 20 and the motor 11, thus allowing the vehicle to run in electric-vehicle (EV) mode. An engine control apparatus (ECU) 60 controls the engine torque.

The hybrid vehicle 1 has a brake 15 near the wheels 14. The brake 15 can use an oil pressure to apply a braking torque to each wheel by pressing a frictional element against internal padding of the brake. The generating source of the brake torque is not limited to an oil pressure and can be an electric brake that uses the driving force of the motor. A brake control apparatus (BrCU) 70 controls a braking force that the brake 15 generates.

The hybrid vehicle 1 also has a hybrid control module (HCM) 100. Upon receiving information on the vehicle state and on operations of a driver, the HCM 100 sends command data to the MCU 30, the BaCU 40, the ATCU 50, the ECU 60, and the BrCU 70. The lower-level control apparatus 30, 40, 50, 60, and 70 control the respective hardware elements on the basis of the received command data.

Next, a configuration of the multi-stage transmission used in the hybrid vehicle having the vehicle control apparatus of the present embodiment is described below using FIG. 2.

Figure 2:
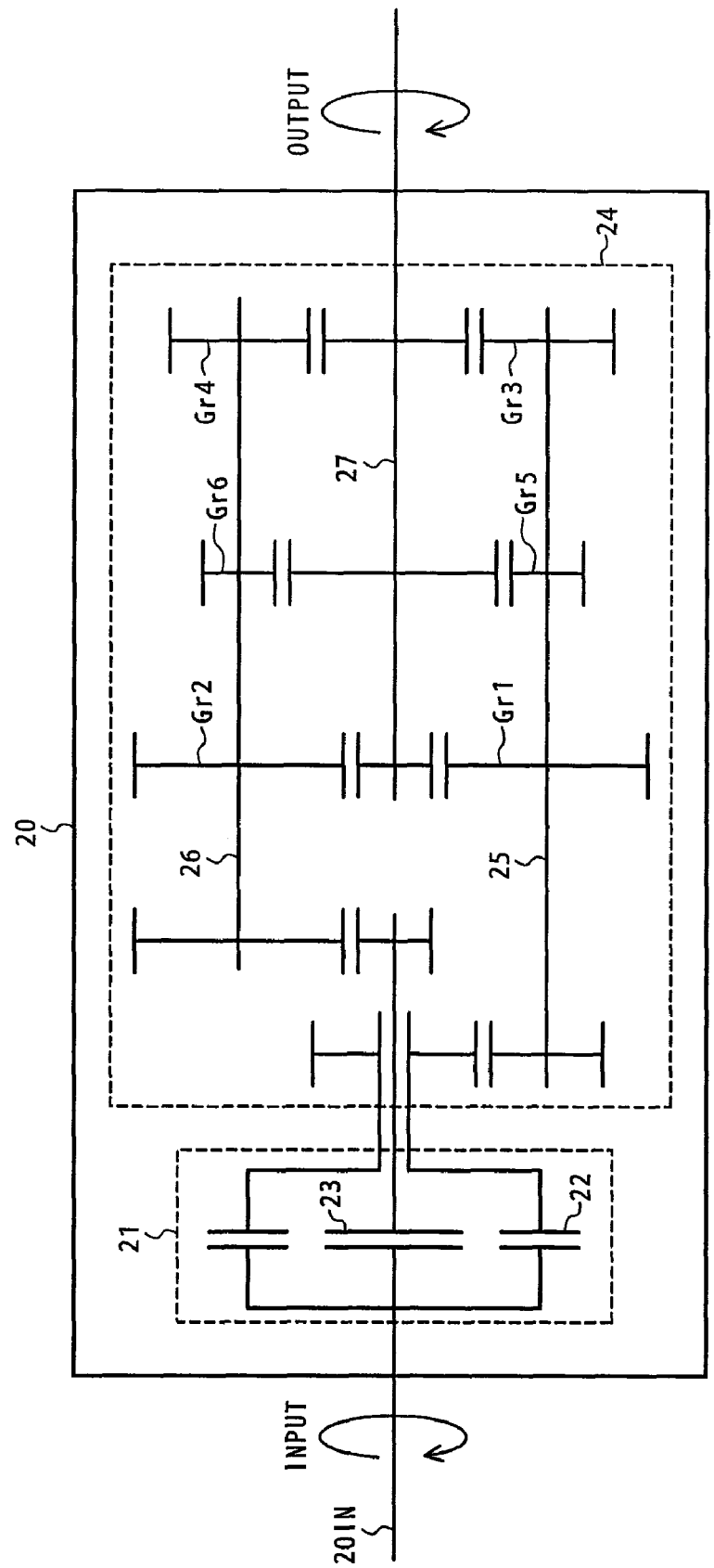
FIG. 2 is a skeleton diagram showing a configuration of an automated multi-stage transmission used in the hybrid vehicle equipped with the vehicle control apparatus of the present embodiment.

FIG. 2 is a skeleton diagram showing the configuration of the multi-stage transmission used in the hybrid vehicle having the vehicle control apparatus of the present embodiment.

The multi-stage transmission 20 is a so-called dual-clutch type of automated multi-stage transmission (AMT) including a dual clutch 21 constructed of two input clutches, and a shift gear mechanism 24.

The dual clutch 21 includes, as its input clutches, an odd-numbered-gear stage clutch 22 and an even-numbered-gear stage clutch 23, both of which connect to the input shaft 20IN of the transmission. The odd-numbered-gear stage clutch 22 and the even-numbered-gear stage clutch 23 are separately operable, so that a torque-transmitting destination can be selectively determined by, for example, engaging one of the two clutches while disengaging the other.

The shift gear mechanism 24 includes an odd-numbered-gear stage shaft 25 (used for first-gear, third-gear, and fifth-gear positions), an even-numbered-gear stage shaft 26 (used for second-gear, fourth-gear, and sixth-gear positions), and the output shaft 27 of the transmission. The odd-numbered-gear stage shaft 25 connects to an output end of the odd-numbered-gear stage clutch 22, and the even-numbered-gear stage shaft 26 connects to an output end of the even-numbered-gear stage clutch 23. A first drive gear Gr1, a third drive gear Gr3, and a fifth drive gear Gr5 are mounted on the odd-numbered-gear stage shaft 25. These drive gears mesh with driven gears that are mounted on the transmission output shaft 27. A second drive gear Gr2, a fourth drive gear Gr4, and a sixth drive gear Gr6 are mounted on the even-numbered-gear stage shaft 26. These drive gears mesh with other driven gears that are mounted on the transmission output shaft 27.

Any of the gears Gr1 to Gr6 of the odd-numbered-gear stage shaft 25 and even-numbered-gear stage shaft 26 can be connected as a shift gear to the shaft by, for example, using a dog clutch (not shown). For a shift from the fifth gear position to the fourth gear position, for example, the fifth gear is connected to the odd-numbered-gear stage shaft 25 via a dog clutch, whereas the fourth gear is engaged with the even-numbered-gear stage shaft 26 via another dog clutch; the odd-numbered-gear stage shaft 25 and the even-numbered-gear stage shaft 26 rotate at speeds of the fifth and fourth gears, respectively, with respect to the transmission output shaft 27.

An actuator (not shown) that controls the engagement and disengagement of the odd-numbered-gear stage clutch 22 and even-numbered-gear stage clutch 23, and an actuator (not shown) that controls the connection of the gears Gr1 to Gr6 of the odd-numbered-gear stage shaft 25 and even-numbered-gear stage shaft 26 are controlled by the ATCU 50 shown in FIG. 1, and thus a desired gear position is selected.

The operation of the vehicle control apparatus according to the present embodiment is next described using FIGS. 3 to 17.

Torque distribution control during a downshift for deceleration is described in the example below. The torque distribution here refers to distributing an inertia torque, in addition to respective torques of the motor 11, the engine 12, the brake 15, and the dual clutch 21, according to the braking force requested from the driver.

First, a total operation flow of the vehicle control apparatus according to the present embodiment is described below using FIG. 3.

Figure 3:
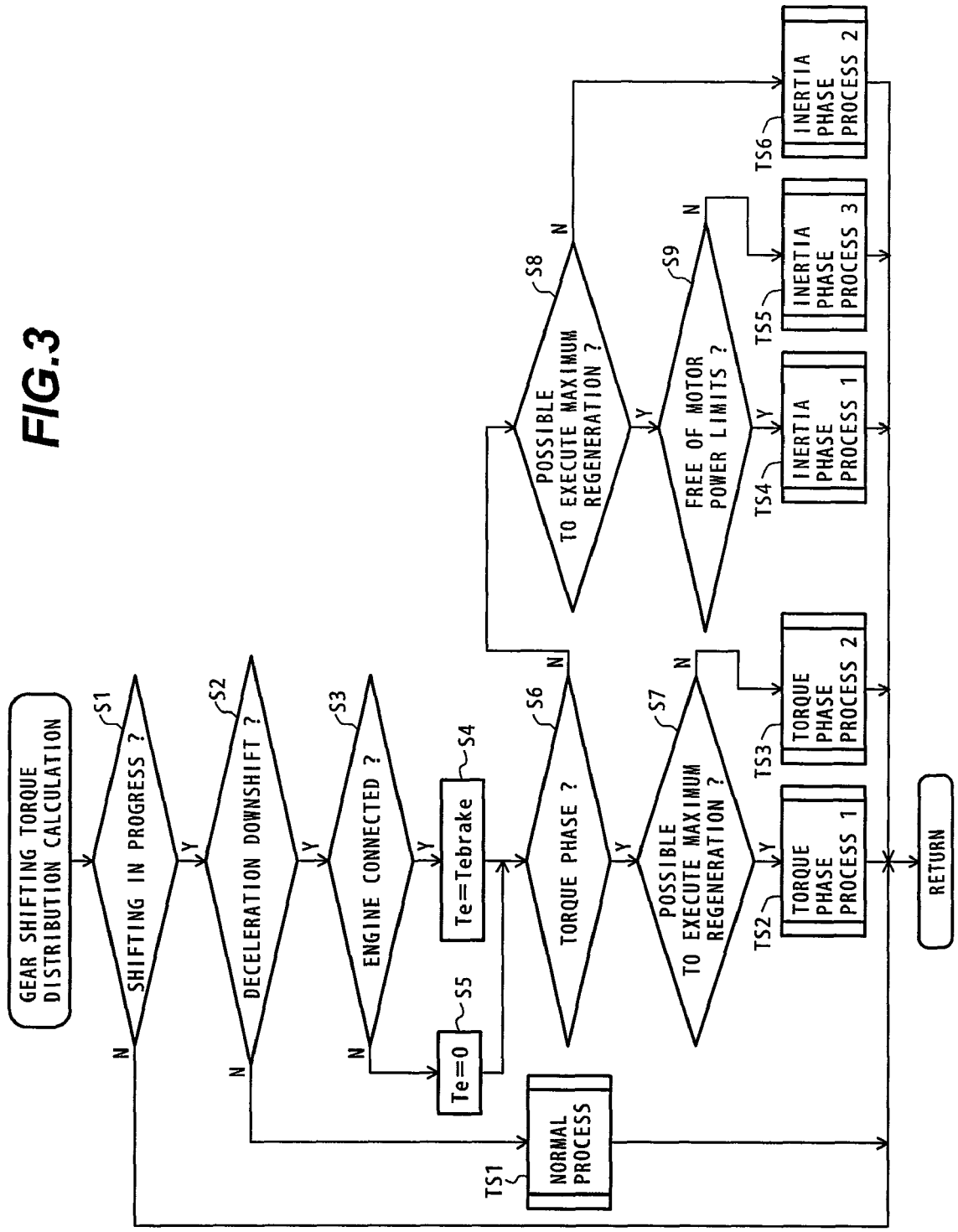
FIG. 3 is a flowchart showing a total operation flow of the vehicle control apparatus according to the present embodiment.

FIG. 3 is a flowchart showing the total operation flow of the vehicle control apparatus according to the present embodiment.

The HCM 100 executes the shifting torque distribution calculation process described below.

In step S1, the HCM 100 judges whether the vehicle is currently in a gearshifting state. A start of the gear shift is discriminated by whether the vehicle state has crossed a shifting line in a gearshifting diagram.

A shifting diagram of downshifts in the automatic transmission 20 controlled by the vehicle control apparatus according to the present embodiment is described below using FIG. 4.

Figure 4:
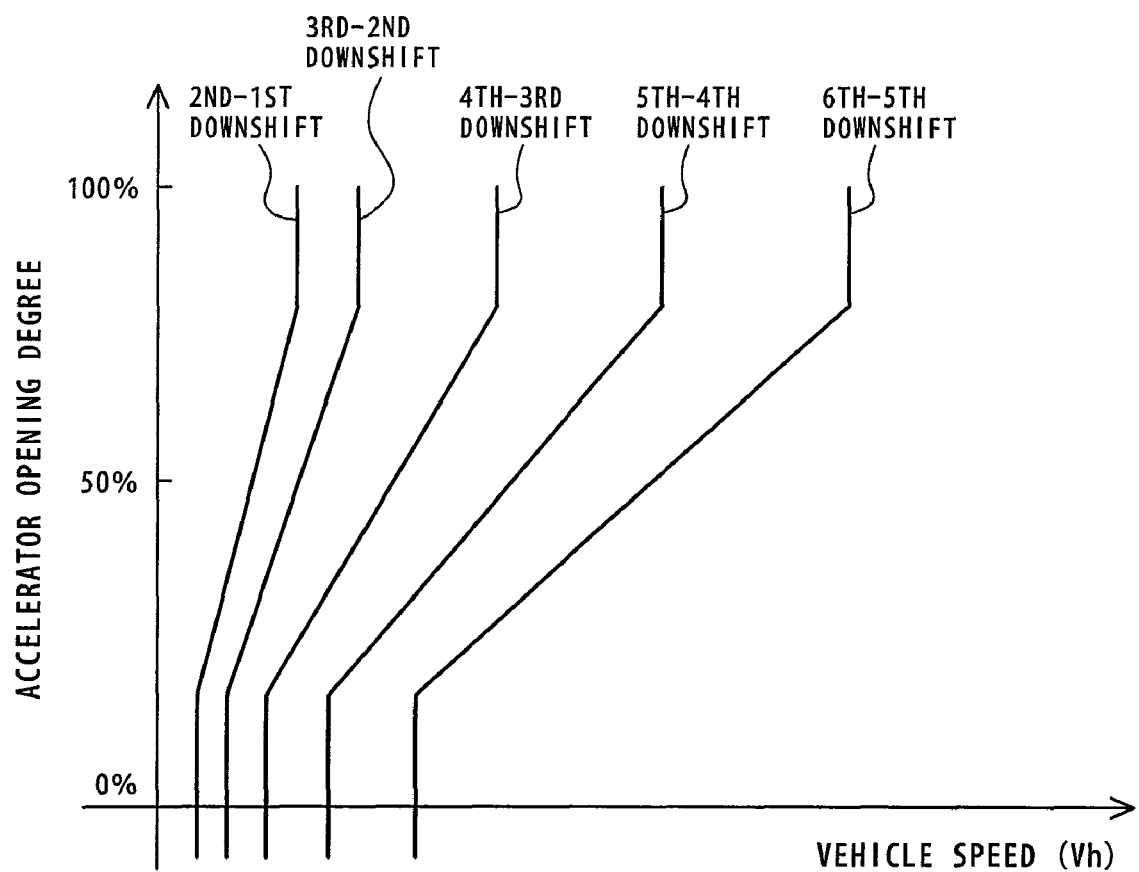
FIG. 4 is a gearshifting diagram of downshifts in the automated transmission controlled by the vehicle control apparatus according to the present embodiment.

FIG. 4 shows an example of a gearshifting diagram of the downshifts in the automatic transmission controlled by the vehicle control apparatus according to the present embodiment.

As shown in FIG. 4, the gearshifting diagram with the vehicle speed plotted on a horizontal axis and an accelerator opening degree on a vertical axis, indicates vehicle speed and accelerator opening degree conditions applied to, for example, a downshift from the second gear to the first gear or a downshift from the third gear to the second gear. Control of the downshift, for example, from the second gear to the first gear or from the third gear to the second gear, is started when these conditions are satisfied. While FIG. 4 is a gearshifting diagram of the downshift control, this diagram can be offset to use a gearshifting diagram for upshifts.

In connection with step S1 of FIG. 3, an end of the gear shift is discriminated by whether a difference between the number of transmission input shaft rotations, Ntrin, and the number of rotations equivalent to an after-shifting transmission input shaft rotational speed, Ntrin2, has decreased below a certain threshold (Ntrthgcfin), that is, whether Ntrthgcfin>|Ntrin2−Ntrin|. For a shift from the fifth gear to the fourth gear, for example, Ntrin2 takes a value obtained by multiplying the number of transmission output shaft rotations, Ntrout (r/min), by a gear ratio of the fourth gear, G4. That is to say, Ntrin2=Ntrout×G4. When the shift is judged to be in progress, control proceeds to next step S2. The control process is terminated when the shift is judged not to be in progress.

If the shift is judged to be in progress, the HCM 100 judges in step S2 whether the kind of shift is a downshift. Gear shifts are divided into upshifts and downshifts according to the kind of gearshifting line crossed. Downshifts are further divided into two kinds: kickdown, which is an abrupt accelerator-pedal activating operation that causes the vehicle state to cross the gearshifting line, and deceleration downshifts, which are slowdown operations that cause the vehicle state to cross the gearshifting line.

Of the above shifts, only deceleration downshifts advances control to step S3, and all other shifts move control to step TS1, a normal process.

The normal process TS1 is the torque distribution process commonly performed when he kind of shifting operation is judged to be either an upshift or kickdown and the vehicle accelerates. Further description of TS1 is omitted.

When, in step S2, the shifting operation is judged to be a deceleration downshift, the HCM 100 judges in step S3 whether the clutch 17 shown in FIG. 1 is engaged and the engine 12 is connected to the automatic transmission 20. Control proceeds to step S4 when the engine is connected to the automatic transmission 20. Control skips to step S5 when the engine is not connected to the automatic transmission 20, as in EV driving mode.

When the engine is not connected to the transmission, the engine brake torque Tebrake in the particular engine state is set as an engine torque Te in step S4. After this, a value obtained by multiplying the engine brake torque Tebrake by a transmission torque ratio Gt is defined as a transmission output shaft rotational speed equivalent of the engine torque, Tetr (=Tebrake×Gt), and then the control process proceeds to step S6.

As in EV driving mode, when the engine is not connected to the transmission, 0 is set as engine torque Te in step S5 (Te=0). After this, the transmission output shaft rotational speed equivalent of the engine torque, Tetr, is defined as 0, and control proceeds to step S6.

Next, the HCM 100 judges in step S6 whether the gear shifting operation is in a torque phase or an inertia phase. When the number of transmission input shaft rotations, Ntrin, departs from the number of before-shifting shaft rotations expressed in transmission input shaft rotational speed, Ntrin1, and the departure is less than a certain threshold (Ntrthphchk), that is, when Ntrthphchk>|Ntrin−Ntrin1|, the gear shift is judged to be in the torque phase, or when it is not so, the gear shift is judged to be in the inertia phase. For a downshift from the fifth gear to the fourth gear, for example, the number of before-shifting shaft rotations expressed in transmission input shaft rotational speed, Ntrin1, takes a value obtained by multiplying the number of transmission output shaft rotations, Ntrout, by a gear ratio of the fifth gear, G5. That is to say, Ntrin1=Ntrout×G5.

When the shift is judged to be in the torque phase, control proceeds to step S7. When it is not so, control skips to step S8.

When, in step S6, the shift is judged to be in the torque phase, the HCM 100 judges in step S7 whether a maximum regenerative torque can be achieved under a current state of the hybrid vehicle.

That is to say, when a brake pedal is stepped on, the HCM 100 calculates the driver-requested braking force Fbrakereq (N) commensurate with the amount of stepping-on of the brake pedal, an estimated value of the vehicle speed (km/h), and other parameters, from a previously created map. The driver-requested braking force Fbrakereq (N) is distributed to the four wheels according to the particular vehicle state. In this case, the braking force that has been distributed to each wheel connected to the multi-stage transmission 20 is added and an equivalent of the transmission output shaft torque is defined as a transmission output shaft equivalent driver-requested braking torque Ttrreq (Nm) with a dynamic radius of the wheels 14 and a final gear ratio of the differential unit 16 taken into account. When the driver-requested braking torque Ttrreq (Nm) is larger than a maximum regenerative torque threshold Ttrthregmax (Nm), that is, when Ttrreq>Ttrthregmax, since regenerating a maximum usable amount of energy does not pose a problem, control proceeds to step TS2, that is, torque phase process 1. When Ttrreq>Ttrthregmax does not hold, control proceeds to step TS3, that is, torque phase process 2.

The maximum regenerative torque threshold Ttrthregmax here is calculated by adding the transmission output shaft rotational speed equivalent of the engine torque, Tetr, that was set in step S4 or S5, to the transmission output shaft equivalent maximum regenerative torque Ttrregmax (Nm) of the motor that is determined from the states of the motor 11 and battery 19 (i.e., Ttrthregmax=Ttrregmax+Tetr). Details of TS2, torque phase process 1, will be described later herein using FIGS. 8 and 9. Details of TS3, torque phase process 2, will be described later herein using FIGS. 10 and 11.

If, in step S6, the shift is judged to be in the inertia phase, the HCM 100 judges in step S8, as in step S7, whether the maximum regenerative torque can be achieved under the current vehicle state.

In that case, however, in step S8, since the shift is already in the inertia phase, the maximum regenerative torque threshold Ttrthregmax is calculated considering an inertial torque Ttrine (Nm) to be generated. That is to say, a calculation is performed to obtain Ttrthregmax=Ttrregmax+Tetr+Ttrine. After this, whether the driver-requested braking torque Ttrreq (Nm) is larger than the maximum regenerative torque threshold Ttrthregmax is judged (Ttrreq>Ttrthregmax), and then when the former is larger, control proceeds to step S9. When it is not so, control proceeds to step TS5, that is, inertia phase process 2. Inertia phase process 2, or TS5, will be detailed later herein using FIGS. 14 and 15.

When, in step S8, maximum regeneration is judged to be possible, the HCM 100 judges in step S9 whether the motor 11 is power-limited.

The power limits of the motor 11 controlled by the vehicle control apparatus according to the present embodiment are described below using FIGS. 5 and 6.

Figure 5:
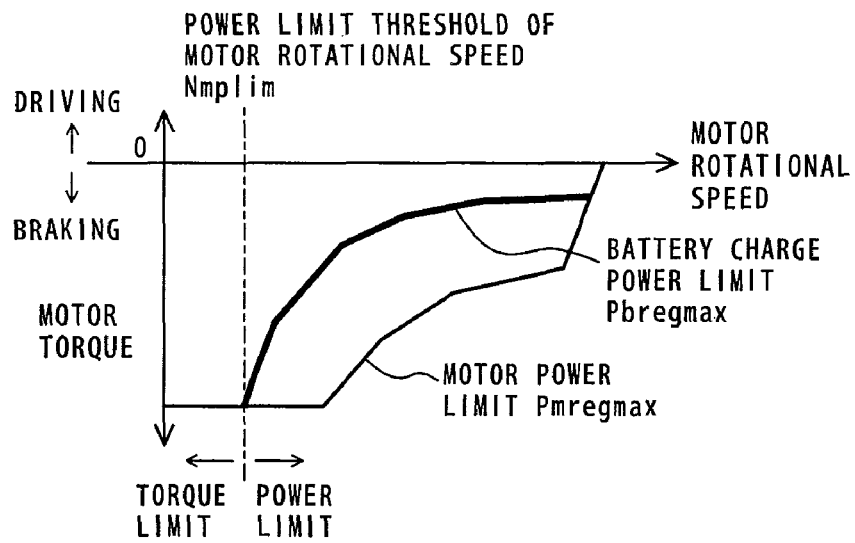
FIG. 5 is an explanatory diagram of power limits for a motor controlled by the vehicle control apparatus according to the present embodiment.

FIG. 5 is an explanatory diagram of the power limits applied to the motor controlled by the vehicle control apparatus according to the present embodiment. FIG. 6 is an explanatory diagram of power limit threshold levels applied to the motor controlled by the vehicle control apparatus according to the present embodiment.

A horizontal axis in FIG. 5 denotes the speed of the motor 11, and a vertical axis denotes the motor torque. An upper side of the vertical axis from its origin denotes a driving side at which the motor 11 generates a driving torque, and a lower side denotes a braking side at which the motor 11 generates a regenerative torque when used as an electric power generator.

The motor 11 usually has the characteristics that at its low speeds, the motor outputs a constant and maximum driving torque and that the driving torque progressively decreases with increases in motor rotational speed. A motor power limit Pmregmax is indicated in FIG. 5 as the characteristic that a braking torque of the motor progressively decreases in an inversely proportional fashion with increases in motor rotational speed.

The thick line (curve) shown in FIG. 5 to denote a battery charge power limit Pbregmax indicates a characteristic of a maximum value of the regenerative torque which the motor can output when power is limited according to the particular state of charge (SOC) of the battery 19. For longer battery life, SOC of the battery 19 is controlled within a certain control range (minimum: SOCmin, maximum: SOCmax). Under a fully charged (SOCmax) state of the battery 19, since further charging is not permitted, the battery charge power limit Pbregmax is set to be 0. Conversely, under a fully discharged (SOCmin) state of the battery, since a maximum achievable amount of charge is desirable, the battery charge power limit Pbregmax is replaced by a full-battery-charge power limit Pbfullregmax that is higher than the motor power upper limit Pmregmax. The battery charge power limit Pbregmax shown in FIG. 5 indicates an SOC value of 60%, for example. As the SOC value increases, the battery charge power limit Pbregmax becomes closer to 0, and as the SOC value decreases, the battery charge power limit Pbregmax approaches the full-battery-charge power limit Pbfullregmax.

The motor rotational speed power limit threshold Nmplim (r/min) shown in FIG. 5 is a motor rotational speed achievable at a point where the motor rotational speed switches from an area of the torque limits to that of the power limits. That is to say, the battery charge power limit Pbregmax is applied when the motor rotational speed is in a range exceeding the motor rotational speed power limit threshold Nmplim (r/min).

Figure 6:
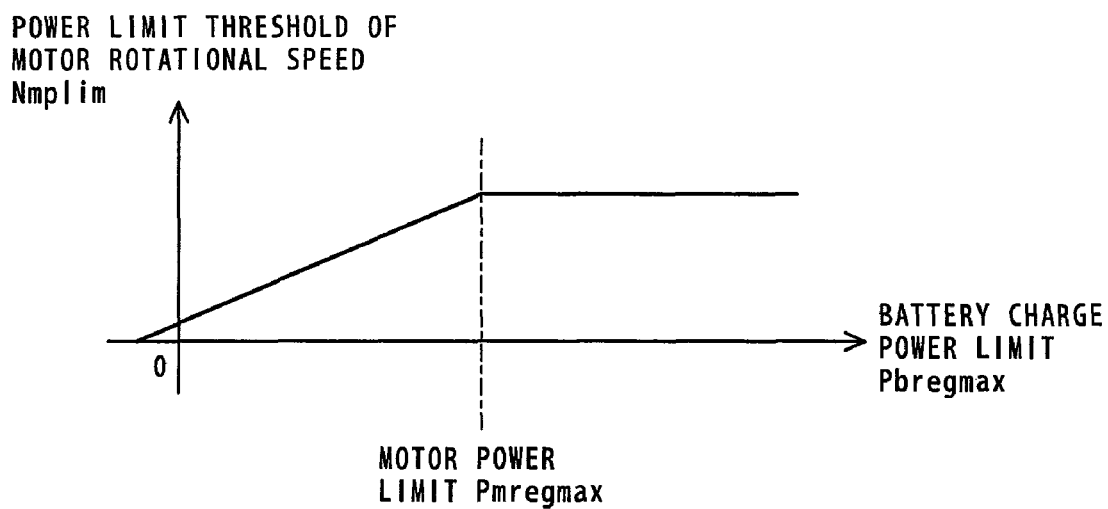
FIG. 6 is an explanatory diagram of power limit thresholds for the motor controlled by the vehicle control apparatus according to the present embodiment.

FIG. 6 represents a relationship between the motor rotational speed power limit threshold Nmplim and the battery charge power limit Pbregmax. When the battery charge power limit Pbregmax exceeds the motor power limit Pmregmax, since the latter prevails, the motor rotational speed power limit threshold Nmplim changes according to a particular value of the battery charge power limit Pbregmax, as shown in FIG. 6.

Once again, the judgment in step S9 is repeated when the maximum regenerative torque can be output, that is, when the judgment in step S8 results in YES (Y), so whether the motor is power-limited is judged by whether the motor rotational speed Nm (r/min) is higher than the motor rotational speed power limit threshold Nmplim (r/min). Since the motor rotational speed power limit threshold Nmplim (r/min) changes according to the value of the battery charge power limit Pbregmax as shown in FIG. 6, this characteristic is derived from a data table. When the motor is not power-limited, control proceeds to inertia phase process 1 that is step TS4, and when the motor is power-limited, control proceeds to inertia phase process 3 that is step TS6. Inertia phase process 1, or TS4, will be detailed later herein using FIG. 13. Inertia phase process 3, or TS6, will be detailed later herein using FIGS. 16 and 17.

Next, details of the control process in steps TS2 to TS6 of FIG. 3 are described using FIGS. 7 to 17.

Figure 7:
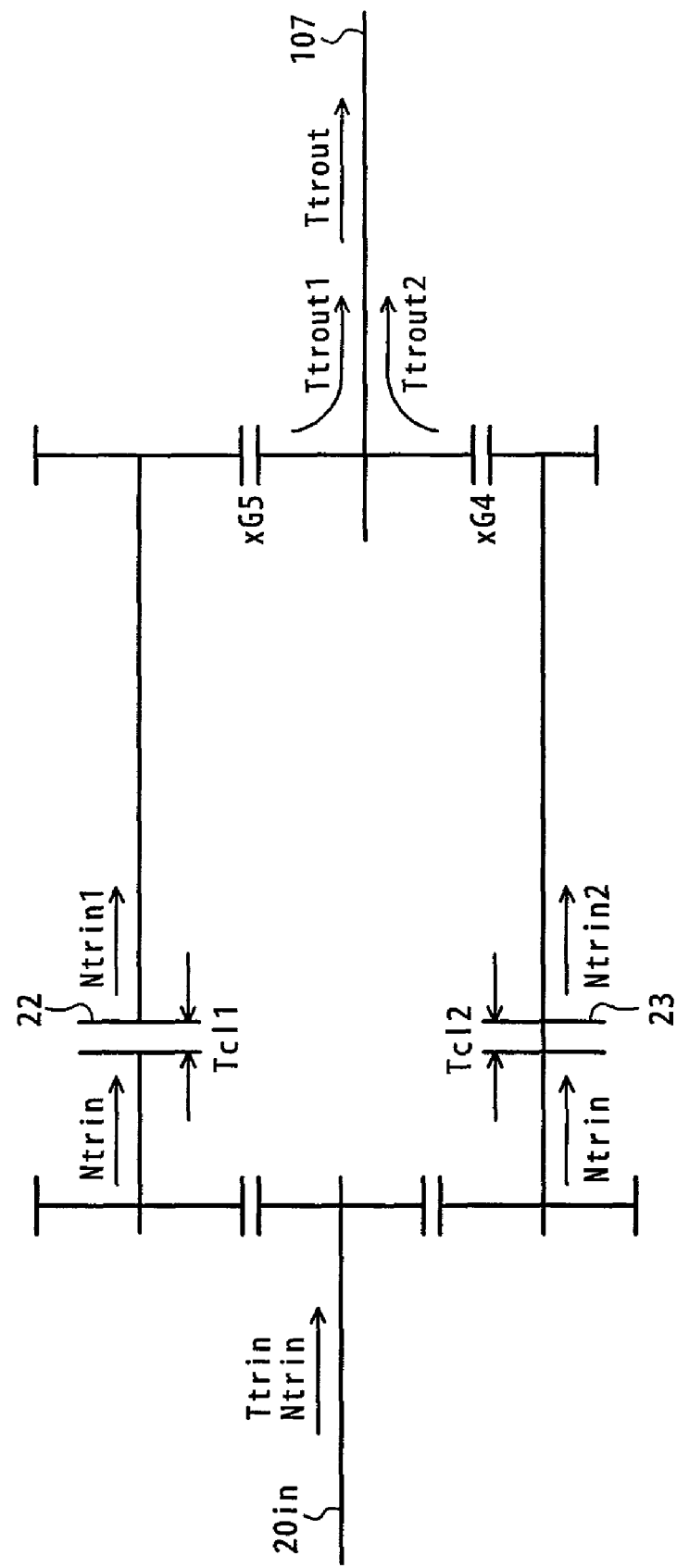
FIG. 7 is a skeleton diagram showing a simplified configuration of the automated multi-stage transmission used for the hybrid vehicle equipped with the vehicle control apparatus of the present embodiment.

A simplified configuration of the automatic multi-stage transmission used for the hybrid vehicle having the vehicle control apparatus of the present embodiment is first described using FIG. 7.

FIG. 7 is a skeleton diagram showing the simplified configuration of the automatic multi-stage transmission used for the hybrid vehicle having the vehicle control apparatus of the present embodiment.

FIG. 7 is a diagram of an equivalent transmission, created by changing the transmission block diagram of FIG. 2 so that a torque-transmitting route can better be understood.

While the dual clutch 101 in FIG. 2 is of a coaxial clutch arrangement, the torque-transmitting route is axially split into two routes for better understandability. A downshift from the fifth gear to the fourth gear is taken by way of example in FIG. 7.

Torque capacity Tc11 in FIG. 7 indicates a torque capacity of the before-shifting clutch 22. Torque capacity Tc12 indicates a torque capacity of the after-shifting clutch 23. The torque capacity refers to a maximum transmittable torque of the clutch. If a torque exceeding the torque capacity is input, the clutch will start slipping and under this sliding state, any torque up to the torque capacity can be transmitted. Hereinafter, the clutch torque denotes the torque capacity.

For a downshift from the fourth gear to the third gear, the clutch 23 operates as the before-shifting clutch, whereas the clutch 22 operates as the after-shifting clutch.

Details of the control process in step TS2 (torque phase process 1) of FIG. 3 are described below using FIGS. 8 and 9.

Figure 8:
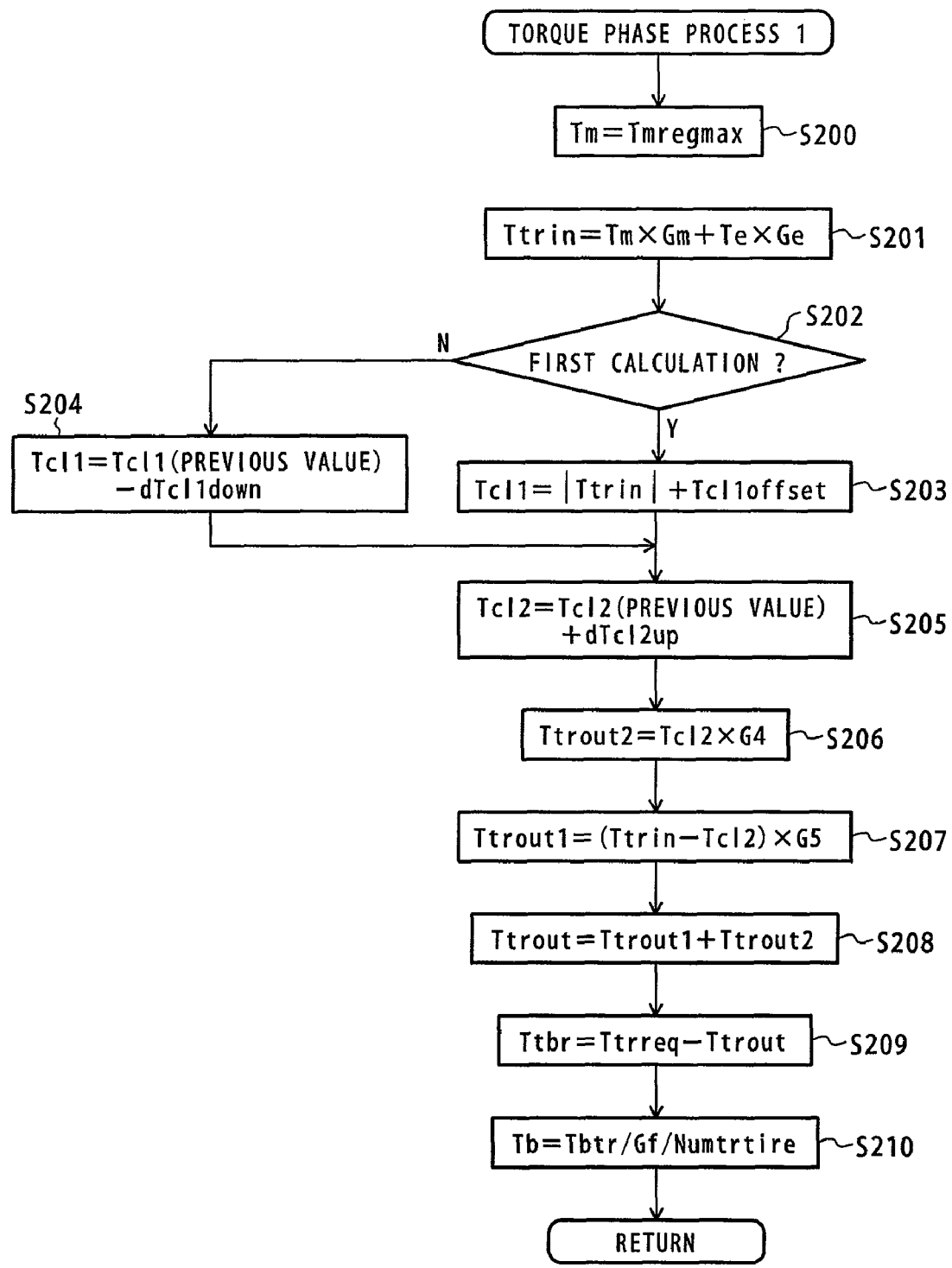
FIG. 8 is a flowchart that shows a process flow of torque phase process 1 in the vehicle control apparatus of the present embodiment.

FIG. 8 is a flowchart that shows a process flow of torque phase process 1 in the vehicle control apparatus of the present embodiment. FIG. 9 is a timing chart that shows details of control in torque phase process 1 by the vehicle control apparatus of the present embodiment.

Figure 9:
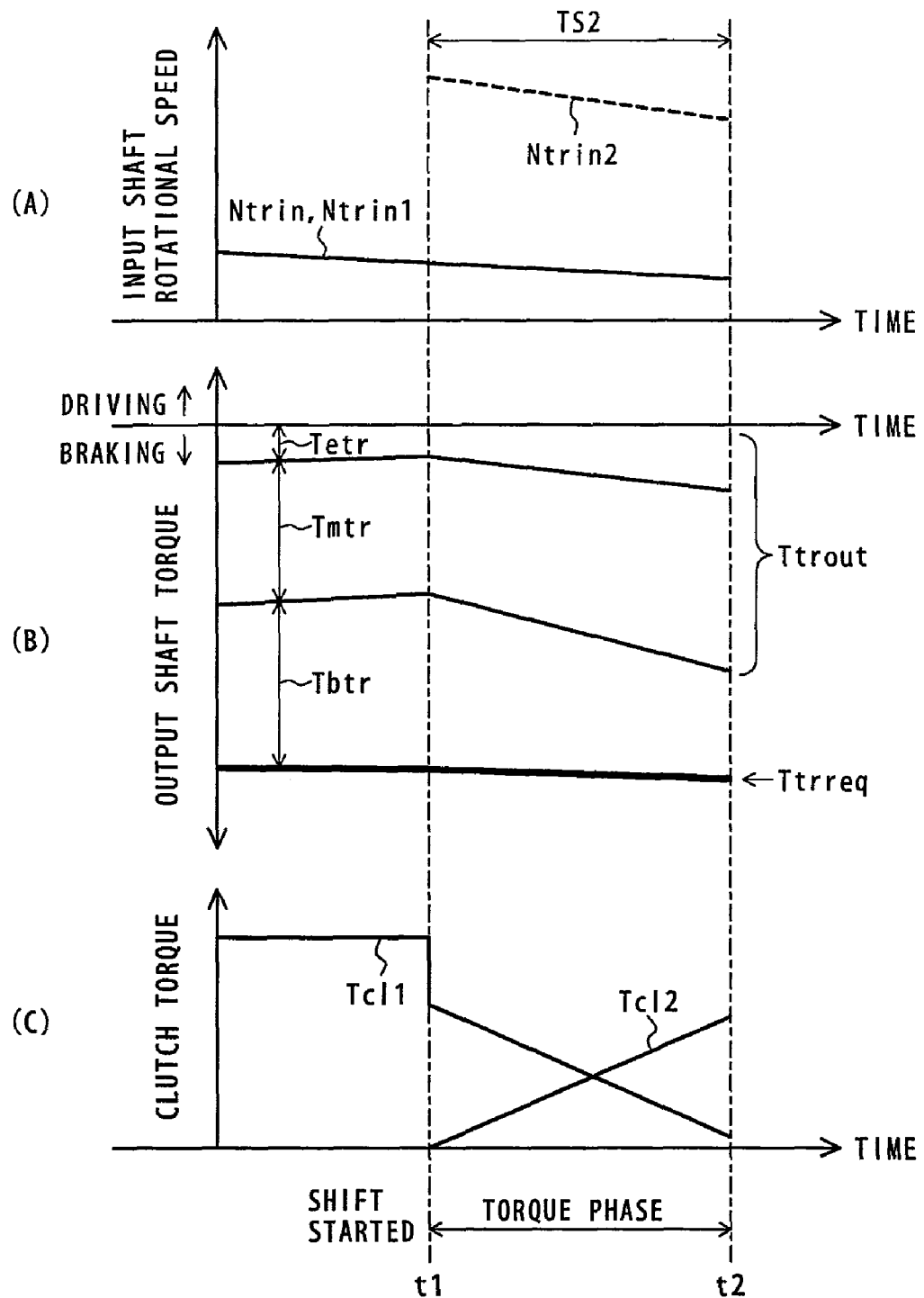
FIG. 9 is a timing chart that shows details of control in torque phase process 1 by the vehicle control apparatus of the present embodiment.

A horizontal axis in FIG. 9 denotes time. Section (A) of FIG. 9 denotes the input shaft rotational speed, section (B) of FIG. 9 denotes the torque distribution expressed in output shaft torque, and section (C) of FIG. 9 denotes the clutch torque.

A downshift from the fifth gear to the fourth gear is taken as an example in the description given below. Also, the process here assumes that in step S3 of FIG. 3, the engine is judged to be connected to the transmission.

Torque phase process 1 that is step TS2 of FIG. 3 is performed in the torque phase and when the maximum usable amount of energy can be regenerated.

Upon a start of shifting, the HCM 100 determines a motor torque Tm (Nm) in step S200 of FIG. 8. Since it is already judged in step S7 of FIG. 3 that the maximum usable amount of energy can be regenerated, a maximum regenerative motor torque Tmregmax (Nm) that can be obtained under that state is assigned to the motor torque Tm, that is, it follows that Tm=Tmregmax.

The HCM 100 calculates the transmission input shaft torque Ttrin in step S201. When a reduction gear ratio from the engine to the transmission is taken as Ge, and a reduction gear ratio from the motor to the transmission, as Gm, all torque components transmitted from the engine to the motor are added to obtain a transmission input shaft torque value of Ttrin=Tm×Gm+Te×Ge.

The HCM 100 determines the before-shifting clutch torque capacity Tc11 (Nm) in steps S202 to S204. Whether the particular calculation is the first calculation process performed after the shifting operation has been started is judged in step S202, and when the calculation is the first one, an initial value with a shift-starting clutch torque offset value (Tc11offset) added to an absolute value of the torque Te+Tm which the before-shifting clutch has been transmitting is assigned to the before-shifting clutch torque Tc11, whereby |Tc11|=|Ttrin|+Tc11offset is obtained in step S203. During second and subsequent torque capacity determination cycles, step S204 is executed for the before-shifting clutch torque capacity Tc11 to decrease in units of a required value dTc11down, whereby Tc11=Tc11 (previous value)−dTc11down is obtained.

Next, in step S205, the HCM 100 determines data so that the after-shifting clutch torque capacity Tc12 (Nm) increases in units of a required value dTc12up to obtain Tc12=Tc12 (previous value)+dTc12up. The after-shifting clutch torque capacity Tc12 acts upon the clutch upon which the before-shifting clutch torque capacity Tc11 does not act. In torque phase process 1 of step TS1, the before-shifting clutch torque decrement dTc11down and the after-shifting clutch torque increment dTc12up have the same value. In addition, this value is of such a magnitude that does not cause a braking shock. This allows for the characteristics of the multi-stage transmission 20.

Next, the HCM 100 determines a braking torque Tb in steps S206 to S210. A transmission output shaft equivalent torque Ttrout2 that is transmitted via the after-shifting clutch 23 is calculated in step S206. In the torque phase, the shaft rotational speed Ntrin of the transmission input shaft 20IN and the after-shifting input shaft equivalent speed Ntrin2 depart from each other and the after-shifting clutch 23 is slipping. Since the torque transmitted under the slipping clutch state becomes the same as the torque capacity, the transmission output shaft equivalent torque Ttrout2 is calculated by multiplying the torque capacity by the after-shifting gear ratio (G4 for a downshift from the fifth gear to the fourth gear). That is to say, Ttrout2=Tcl2×G4 is obtained.

In step S207, the HCM 100 calculates a transmission output shaft equivalent torque Ttrout1 that is transmitted via the before-shifting clutch 22. Since the transmission input shaft torque Ttrin is transmitted to the before-shifting clutch 22 and the after-shifting clutch 23 through two split routes, the transmission output shaft equivalent torque Ttrout1 can be calculated by subtracting the slipping torque Tcl2 of the after-shifting clutch 23 from the transmission input shaft torque Ttrin and then multiplying the difference by the before-shifting gear ratio (G5 for a downshift from the fifth gear to the fourth gear). That is to say, Ttrout1=(Ttrin−Tcl2)×G5 is obtained.

In step S208, the HCM 100 calculates the transmission output shaft torque Ttrout that is actually output from the transmission output shaft 107. The transmission output shaft torque Ttrout can be calculated as (Ttrout=Ttrout1+Ttrout2) by adding the transmission output shaft equivalent torque Ttrout1 and transmission output shaft equivalent torque Ttrout2 that were calculated in steps S206 and S207, respectively.

In step S209, the HCM 100 determines a transmission output shaft equivalent braking torque Tbtr. The transmission output shaft equivalent braking torque Tbtr is calculated as (Tbtr=Ttrreq−Ttrout) by subtracting the transmission output shaft torque Ttrout from the transmission output shaft equivalent driver-requested braking torque Ttrreq.

In step S210, the HCM 100 calculates the braking torque Tb. The braking torque Tb is calculated as (Tbtr=Tb/Gf/Numtrtire) by dividing the transmission output shaft equivalent braking torque Tbtr by the final gear ratio Gf of the differential unit 16 and the number of wheels, Numtrtire, to which the torque from the transmission is transmitted.

Control in torque phase process 1 is described below using FIG. 9. Control in torque phase process 1 occurs at time t1 to time t2 in FIG. 9.

In section (B) of FIG. 9, Tetr is the engine torque, that is, the transmission output shaft equivalent of the engine brake torque. Also, Tmtr is the motor torque, that is, the transmission output shaft equivalent of the motor regenerative torque. Additionally, Tbtr is the transmission output shaft equivalent of the braking torque of the brake. Furthermore, Ttrreq is the driver-requested braking torque, or the transmission output shaft equivalent of the total braking force target value. The transmission output shaft equivalent Tmtr of the motor regenerative torque and the transmission output shaft equivalent Tbtr of the braking torque are distributed so that the total braking force derived by adding the transmission output shaft equivalent Tetr of the engine brake torque, the transmission output shaft equivalent Tmtr of the motor regenerative torque, and the transmission output shaft equivalent Tbtr of the braking torque becomes the transmission output shaft equivalent driver-requested braking torque Ttrreq that is equivalent to the total braking force target value.

As shown in section (A) of FIG. 9, although the gear shift is started from the time t1, the shift is initially in the torque phase and even at time t2 when the torque phase terminates, a departure still exists between the shaft rotational speed Ntrin of the transmission input shaft 20IN, the transmission input shaft equivalent before-shifting shaft rotational speed Ntrin1, and the transmission input shaft equivalent after-shifting shaft rotational speed Ntrin2.

As shown in section (C) of FIG. 9, at the time t1, the product of the absolute value of the torque Te+Tm which the before-shifting clutch has been transmitting, and the shift-starting clutch torque offset value (Tcl1offset), is obtained as the before-shifting clutch torque Tcl1 by execution of the process in step S203 of FIG. 8. After this, step S204 is executed for the before-shifting clutch torque capacity Tcl1 to decrease in units of the required value dTcl1down.

Conversely, in step S205, the after-shifting clutch torque capacity Tcl2 (Nm) increases in units of the required value dTcl2up. At this time, the before-shifting clutch torque decrement dTcl1down and the after-shifting clutch torque increment dTcl2up have the same value, so an increment in the before-shifting clutch torque Tcl1 and a decrement in the after-shifting clutch torque Tcl2 are equal to each other. This counterbalances the torque changes occurring during torque re-routing from the before-shifting clutch 22 to the after-shifting clutch 23.

As shown in section (B) of FIG. 9, the transmission output shaft equivalent value Tetr of the engine torque and the transmission output shaft equivalent value Tmtr of the motor torque gradually increase in the torque phase. The transmission output shaft equivalent value Tetr of the engine torque is calculated as $Ttrout \times [(Te \times Ge)/(Te \times Ge + Tm \times Gm)]$, where Ttrout is the transmission output shaft torque, Te the engine torque, Ge the reduction gear ratio from the engine to the transmission, and Gm the reduction gear ratio from the motor to the transmission. In other words, the transmission output shaft equivalent value Tetr of the engine torque is proportional to the transmission output shaft torque Ttrout. Also, the transmission output shaft equivalent value Tmtr of the motor torque is calculated as $Ttrout \times [(Tm \times Gm)/(Te \times Ge + Tm \times Gm)]$, and is equivalent to the regenerative braking torque. The transmission output shaft equivalent value Tmtr of the motor torque is also proportional to the transmission output shaft torque Ttrout.

Between the time t1 and the time t2, the transmission output shaft equivalent value Tetr of the engine torque and the transmission output shaft equivalent value Tmtr of the motor torque gradually increase since torque transmission is gradually re-routed from the fifth gear to the fourth gear. The product of the transmission output shaft equivalent value Tetr and the transmission output shaft equivalent value Tmtr is the transmission output shaft torque Ttrout. That is to say, the transmission output shaft torque Ttrout gradually increases in the torque phase.

The transmission output shaft equivalent driver-requested braking torque Ttrreq used in step S209 of FIG. 8 is equivalent to the product of the transmission output shaft equivalent value Tetr, transmission output shaft equivalent value Tmtr, and transmission output shaft equivalent braking torque Tbtr that are shown in section (B) of FIG. 9.

In step S209 of FIG. 8, the transmission output shaft equivalent braking torque Tbtr is calculated as (Transmission output shaft equivalent driver-requested braking torque Ttrreq−Transmission output shaft torque Ttrout). For example, between the time t1 and the time t2, when the transmission output shaft equivalent driver-requested braking torque Ttrreq is constant, the braking torque Tb decreases with increases in the transmission output shaft torque Ttrout. That is, as shown in section (B) of FIG. 9, as the transmission output shaft equivalent value Tetr of the engine torque and the transmission output shaft equivalent value Tmtr of the motor torque increase, the transmission output shaft equivalent driver-requested braking torque Ttrreq decreases, whereby Ttrreq is controlled to maintain its constant value.

As calculated in step S210 of FIG. 8, the braking torque Tb is proportional to the transmission output shaft equivalent braking torque Tbtr. In the present embodiment, therefore, the braking torque Tb decreases according to a particular variation in transmission output shaft torque Ttrout, so the total braking force remains invariant and braking shocks correspondingly do not easily occur.

The above description applies to a case in which the engine is connected to the transmission in step S3 of FIG. 3. When the engine and the motor are connected to the transmission, the regenerative torque of the motor (i.e., at the transmission output shaft, the transmission output shaft equivalent motor torque Tmtr), the engine brake torque (i.e., at the transmission output shaft, the transmission output shaft equivalent engine torque Tetr), and the braking torque of the brake (i.e., at the transmission output shaft, the transmission output shaft equivalent brake torque Tbtr) are distributed during the deceleration shift. This distribution ensures that the total braking force target value of the vehicle (i.e., at the transmission output shaft, the transmission output shaft torque Ttrout) matches a required value (i.e., at the transmission output shaft, the transmission output shaft equivalent driver-requested braking torque Ttrreq). More specifically, each torque is distributed to change the braking torque of the brake (i.e., at the transmission output shaft, the transmission output shaft equivalent brake torque Tbtr) in accordance with the change in the regenerative torque of the motor (i.e., at the transmission output shaft, the transmission output shaft equivalent motor torque Tmtr) and the change in the engine brake torque (i.e., at the transmission output shaft, the transmission output shaft equivalent engine torque Tetr). Braking shocks can thus be reduced without a change in total braking torque.

In a case that the engine is not connected to the transmission, engine torque Te=0 is set in step S5 of FIG. 3. The transmission output shaft equivalent engine torque Tetr in section (B) of FIG. 9, therefore, becomes 0. In this case, during the deceleration shift, the regenerative torque of the motor (i.e., at the transmission output shaft, the transmission output shaft equivalent motor torque Tmtr) and the braking torque of the brake (i.e., at the transmission output shaft, the transmission output shaft equivalent brake torque Tbtr) are distributed so that the total braking force target value of the vehicle (i.e., at the transmission output shaft, the transmission output shaft torque Ttrout) matches the required value (i.e., at the transmission output shaft, the transmission output shaft equivalent driver-requested braking torque Ttrreq). More specifically, each torque is distributed to change the braking torque of the brake (i.e., at the transmission output shaft, the transmission output shaft equivalent brake torque Tbtr) in accordance with the change in the regenerative torque of the motor (i.e., at the transmission output shaft, the transmission output shaft equivalent motor torque Tmtr). Braking shocks can thus be reduced without a change in total braking torque.

The case that the engine is not connected to the transmission refers to a case in which the hybrid vehicle is running in EV mode. In electric vehicles, however, since only the motor is connected to the transmission, essentially the same effects as when the engine is not connected to the transmission can be achieved in that mode. That is to say, during a deceleration shift, braking shocks can be reduced without a change in total braking torque by distributing the regenerative torque of the motor (i.e., at the transmission output shaft, the transmission output shaft equivalent motor torque Tmtr) and the braking torque of the brake (i.e., at the transmission output shaft, the transmission output shaft equivalent brake torque Tbtr) so that the total braking force target value of the vehicle (i.e., at the transmission output shaft, the transmission output shaft torque Ttrout) matches the required value (i.e., at the transmission output shaft, the transmission output shaft equivalent driver-requested braking torque Ttrreq).

Details of the control process in step TS3 (torque phase process 2) of FIG. 3 are described below using FIGS. 10 and 11.

Figure 10:
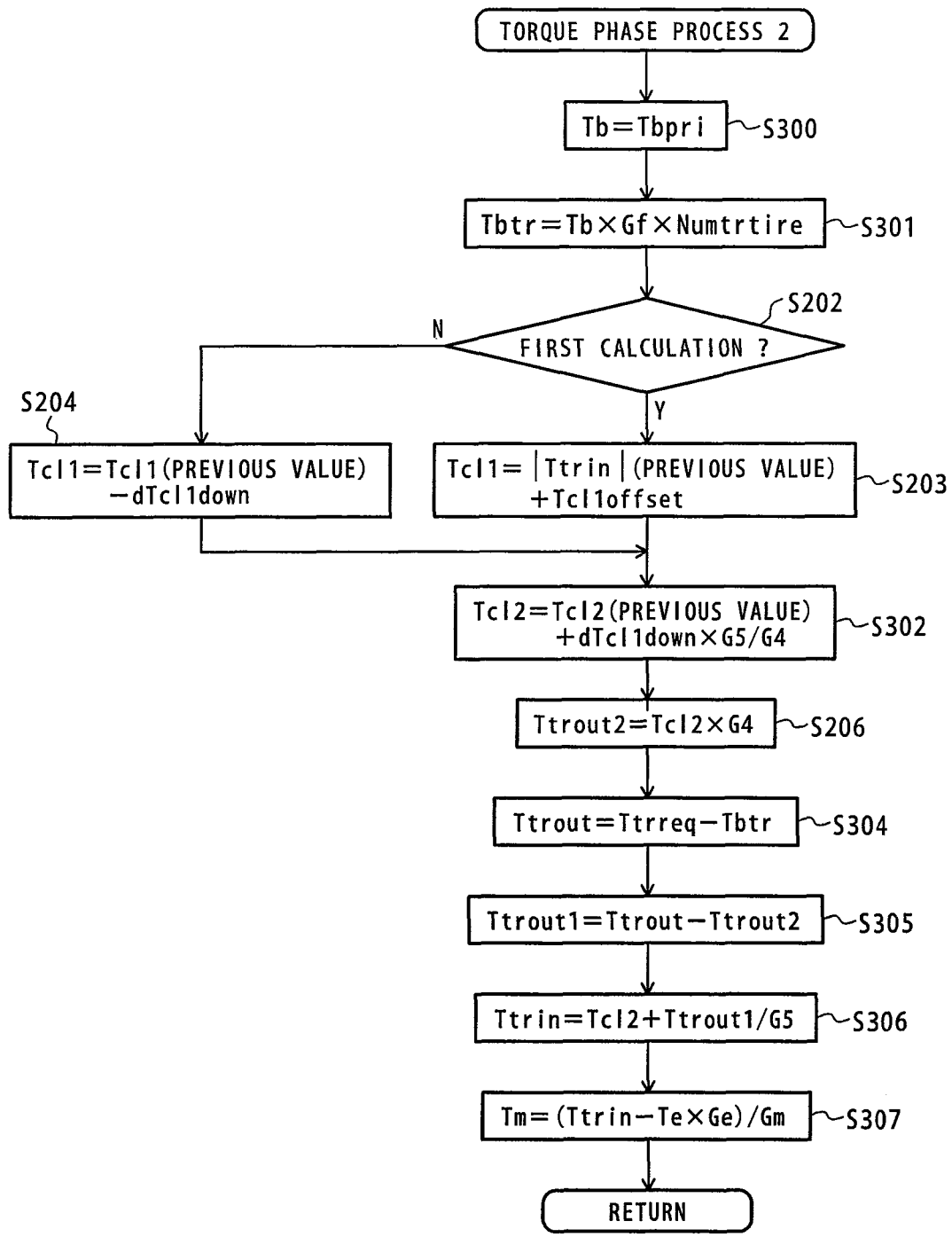
FIG. 10 is a flowchart that shows a process flow of torque phase process 2 in the vehicle control apparatus of the present embodiment.

FIG. 10 is a flowchart that shows a process flow of torque phase process 2 in the vehicle control apparatus of the present embodiment. FIG. 11 is a timing chart that shows details of control in torque phase process 2 by the vehicle control apparatus of the present embodiment.

Figure 11:
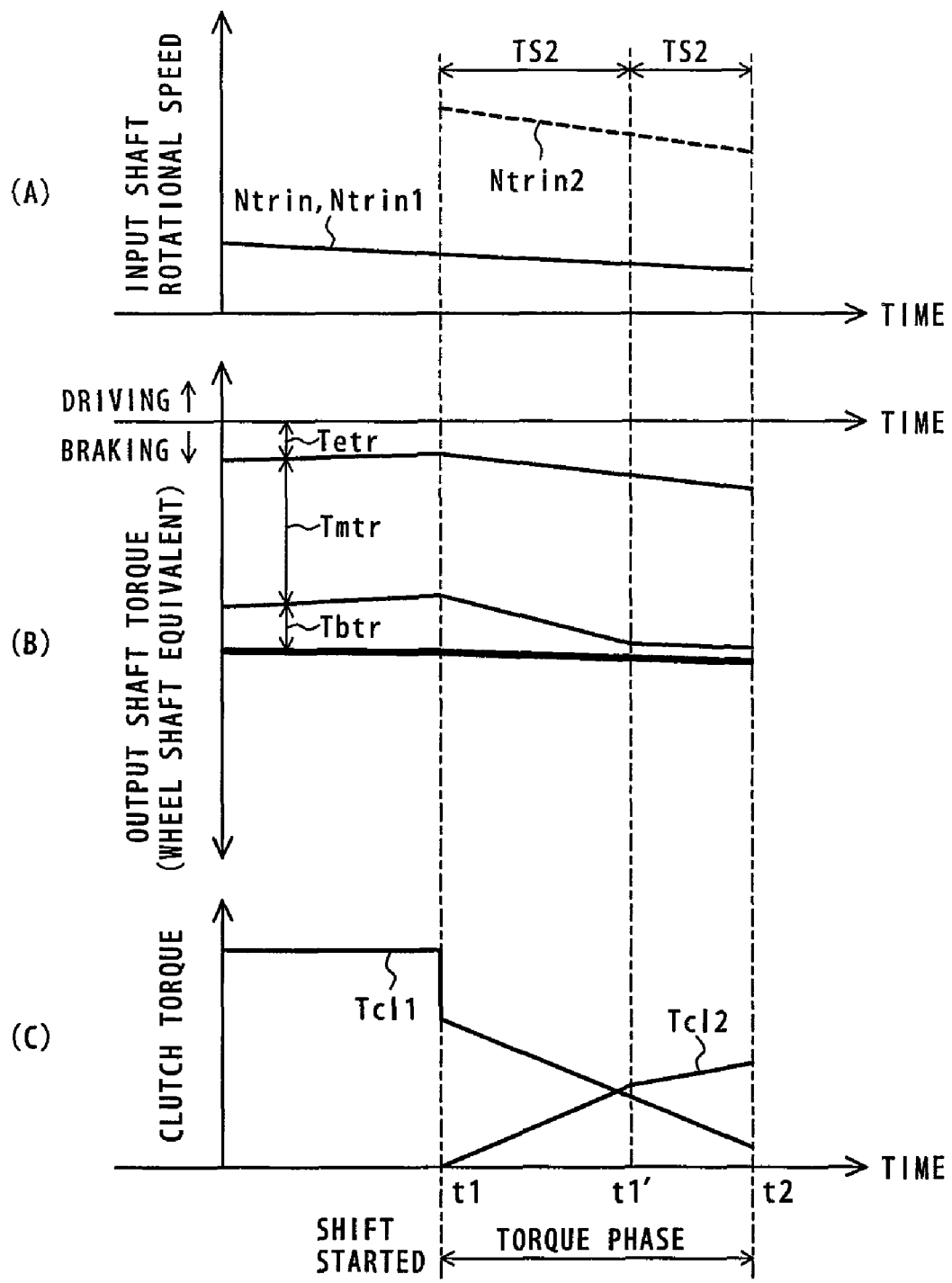
FIG. 11 is a timing chart that shows details of control in torque phase process 2 by the vehicle control apparatus of the present embodiment.

A horizontal axis in FIG. 11 denotes time. Section (A) of FIG. 11 denotes the input shaft rotational speed, section (B) of FIG. 11 denotes the torque distribution expressed in output shaft torque, and section (C) of FIG. 11 denotes the clutch torque.

A downshift from the fifth gear to the fourth gear is taken as an example in the description given below. Also, the process here assumes that in step S3 of FIG. 3, the engine is judged to be connected to the transmission.

Torque phase process 2 that is step TS3 of FIG. 3 is performed when, following completion of the judgment on the torque phase in step S6 of FIG. 3, the judgment on maximum regeneration in step S7 of FIG. 3 indicates that the driver-requested torque will be exceeded.

In FIG. 11, the downshift begins at the time t1, then the torque ratio rises during torque phase process 1 of step TS2, and when it is judged at time T1' that the regenerative braking torque has already reached its maximum usable level, the judgment results in step S7 of FIG. 3 change and process control moves to torque phase process 2 of step TS3.

In torque phase process 2 (step TS3), conversely to torque phase process 1 (step TS2), the braking torque is calculated first and then the regenerating torque is calculated. Calculation of the transmission clutch torque Tcl2 also slightly differs.

In steps S300 and S301 of FIG. 10, the HCM 100 determines the braking torque of the brake 15. In step S300, a braking priority torque Tbpri is assigned to the braking torque Tb, that is, Tb=Tbpri is established. Completely reducing the braking torque to 0 causes the frictional element to leave the brake, so the frictional element needs to be lightly pressed against the brake. This prevents the braking torque from delaying in startup of rising. The braking priority torque Tbpri is a minimum braking torque requirement determined allowing for the characteristics of the brake 15. Next, step S301 is executed to convert the calculated braking torque Tb into the transmission output shaft equivalent brake torque Tbtr, whereby Tbtr=Tb×Gf×Numtrtire is established.

Next, the HCM 100 calculates the clutch torques Tcl1 and Tcl2 in steps S202, S203, S204, and S302. The calculation steps in S202 to S204 are the same as those of torque phase process 1 shown in FIG. 8. In step S302, the after-shifting clutch torque Tcl2 is calculated, but unlike that of torque phase process 1 in FIG. 8, the increase in the clutch torque is adjusted to obtain the same output torque on the output shaft of the transmission, that is, Tcl2=Tcl2 (previous value)+dTcl1down×G5/G4.

Next, in step S206, the transmission output torque Ttrout is calculated similarly to that of torque phase process 1 shown in FIG. 8.

Next, in steps S304 to S307, the HCM 100 calculates the motor torque Tm from the transmission output shaft equivalent driver-requested braking torque Ttrreq. In step S304, the transmission output shaft equivalent braking torque Tbtr is subtracted from the transmission output shaft equivalent driver-requested braking torque Ttrreq, whereby the transmission output shaft torque Ttrout is calculated (Ttrout=Ttrreq−Tbtr). In step S305, the transmission output shaft equivalent torque Ttrout2 transmitted via the after-shifting clutch 23 is subtracted from the transmission output shaft torque Ttrout, whereby the transmission output shaft equivalent torque Ttrout1 transmitted via the before-shifting clutch 22 is calculated (Ttrout1=Ttrout−Ttrout2). In step S306, the transmission input shaft torque Ttrin is calculated from the clutch torque Tcl2, the transmission output shaft torque Ttrout, and the gear ratio G5 of the fifth gear (Ttrin=Tcl2+Ttrout1/G5). Next, in step S307, the value obtained by subtracting from the transmission input shaft torque Ttrin the value which has been derived by multiplying the engine torque Te by the engine-to-transmission reduction gear ratio Ge is divided by the motor-to-transmission reduction ratio Gm, whereby the motor torque Tm is calculated as Tm=(Ttrin−Te×Ge)/Gm.

Control in torque phase process 2 is described in detail below using FIG. 11. The section of time t1' to t2 in FIG. 11 relates to control in torque phase process 2 of step TS3.

As shown in section (A) of FIG. 11, the shift is started from the time t1, but the shift is initially in the torque phase and even at the time t2 when the torque phase terminates, a departure still exists between the shaft rotational speed Ntrin of the transmission input shaft 20IN, the transmission input shaft equivalent before-shifting shaft rotational speed Ntrin1, and the transmission input shaft equivalent after-shifting shaft rotational speed Ntrin2.

As shown in section (C) of FIG. 11, from the time t1 to the time t1', execution of torque phase process 1 in step TS2 reduces the before-shifting clutch torque Tcl1 in units of the required value dTcl1down and increases the after-shifting clutch torque Tcl2 in units of the required value dTcl2up.

When it is judged at the time t1' that the maximum achievable regenerative braking torque has been reached, control moves to torque phase process 2 of step TS3 in FIG. 3. In step S302 of FIG. 10, the increase in the clutch torque is adjusted to obtain the same output torque on the output shaft of the transmission, that is, Tcl2=Tcl2 (previous value)+dTcl1down×G5/G4. As a result, the after-shifting clutch torque capacity Tcl2 changes in the rate of increase.

Meanwhile, the braking torque Tb is assigned as the braking priority torque Tbpri (minimum braking torque) by the execution of steps S300 and S301 of FIG. 10, so the transmission output shaft equivalent braking torque Tbtr is also defined as a minimum constant value.

After this, steps S304 to S307 follow for the HCM 100 to calculate the motor torque Tm so that the driver-requested braking torque Ttrreq is maintained.

As a result, in accordance with the torque ratio increasing from the gear ratio G5 to the gear ratio G4, the after-shifting clutch torque Tcl2 and the motor torque Tm are reduced to satisfy the driver-requested torque. Thus, braking shocks due to excess of the driver-requested braking torque Ttrreq can be reduced. In addition, during torque distribution in step TS3, the braking torque Tb distributed is controlled to its minimum value determined from the brake characteristics. This allows the amount of regeneration of the motor torque Tm to be maximized and thus the amount of regeneration to be increased.

In the case that the engine is not connected to the transmission, engine torque Te=0 is set in step S5 of FIG. 3. The transmission output shaft equivalent engine torque Tetr in section (B) of FIG. 11, therefore, becomes 0. In this case, braking shocks due to excess of the driver-requested braking torque Ttrreq can also be reduced. In addition, during torque distribution in step TS3, the braking torque Tb distributed is controlled to its minimum value determined from the brake characteristics. This allows the amount of regeneration of the motor torque Tm to be maximized and thus the amount of regeneration to be increased.

The case that the engine is not connected to the transmission refers to a case in which the hybrid vehicle is running in EV mode. In electric vehicles, however, since only the motor is connected to the transmission, essentially the same effects as when the engine is not connected to the transmission can be achieved in that mode as well. That is to say, during a deceleration shift, braking shocks due to excess of the driver-requested braking torque Ttrreq can also be reduced. In addition, during torque distribution in step TS3, the braking torque Tb distributed is controlled to its minimum value determined from the brake characteristics. This allows the amount of regeneration of the motor torque Tm to be maximized and thus the amount of regeneration to be increased.

Details of the control process in step TS4 (inertia phase process 1) of FIG. 3 are described below using FIGS. 12 and 13.

Figure 12:
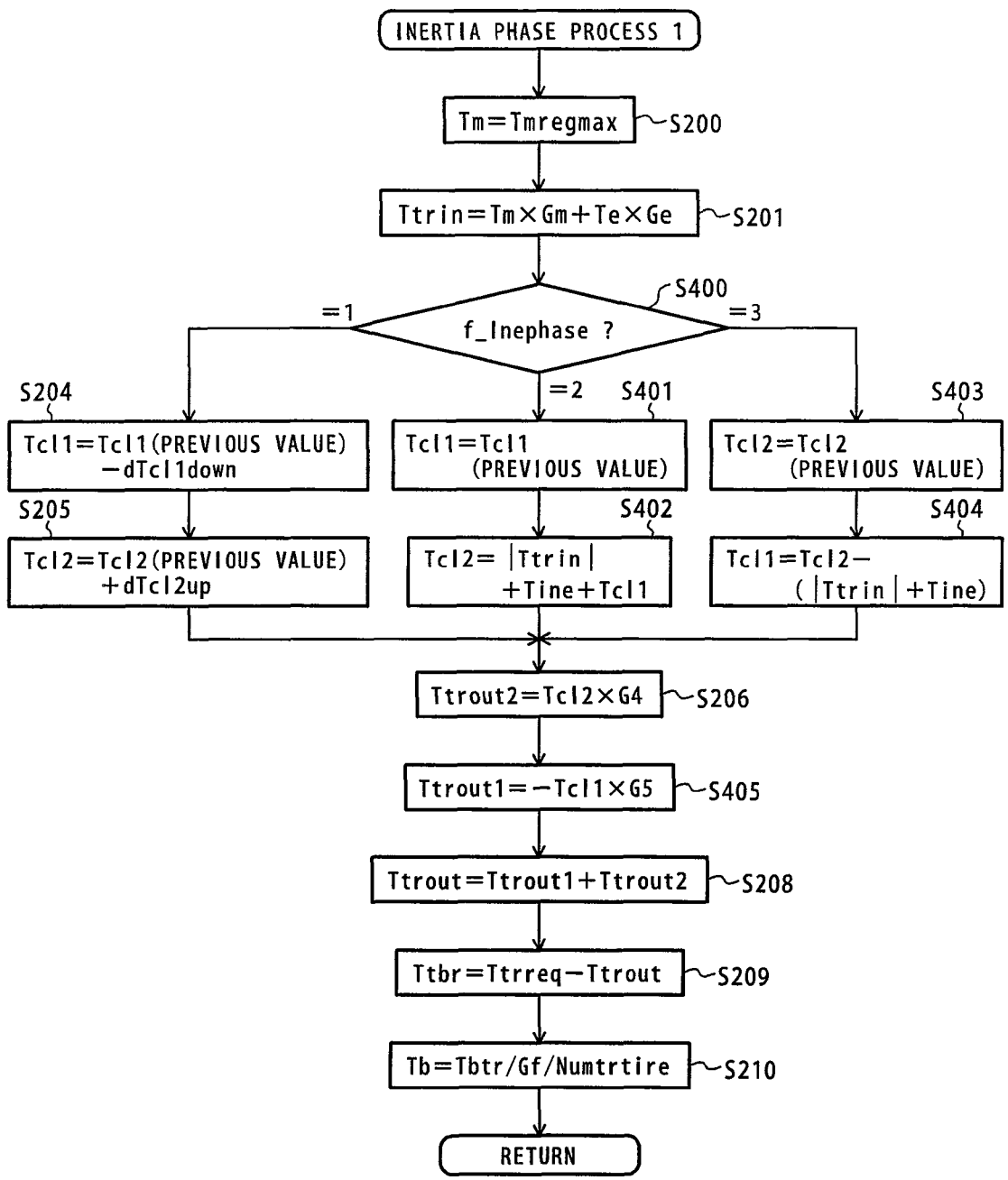
FIG. 12 is a flowchart that shows a process flow of inertia phase process 1 in the vehicle control apparatus of the present embodiment.

FIG. 12 is a flowchart that shows a process flow of inertia phase process 1 in the vehicle control apparatus of the present embodiment. FIG. 13 is a timing chart that shows details of control in inertia phase process 1 by the vehicle control apparatus of the present embodiment.

Figure 13:
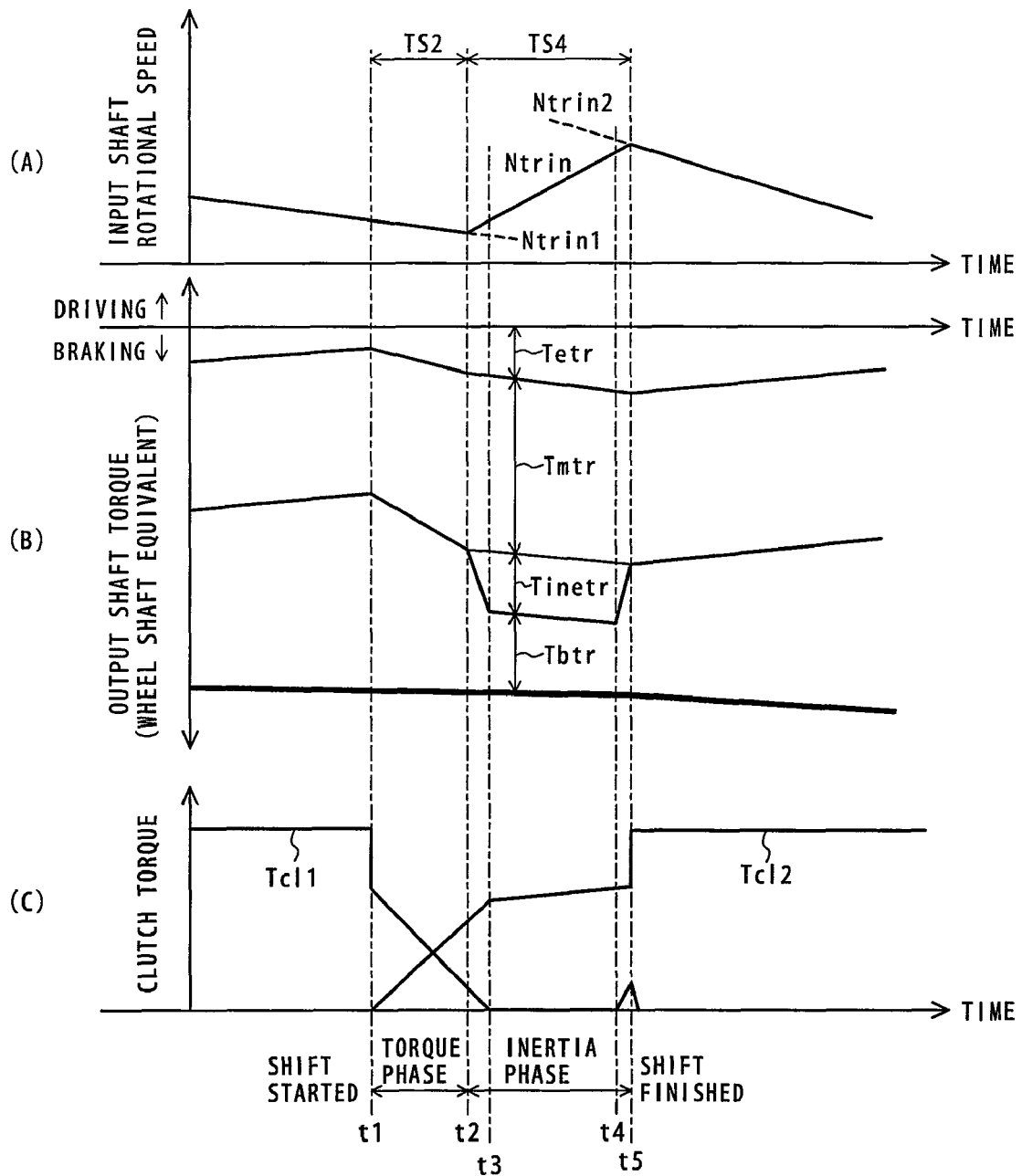
FIG. 13 is a timing chart that shows details of control in inertia phase process 1 by the vehicle control apparatus of the present embodiment.

A horizontal axis in FIG. 13 denotes time. Section (A) of FIG. 13 denotes the input shaft rotational speed, section (B) of FIG. 13 denotes the torque distribution expressed in output shaft torque, and section (C) of FIG. 13 denotes the clutch torque.

A downshift from the fifth gear to the fourth gear is taken as an example in the description given below. Also, the process here assumes that in step S3 of FIG. 3, the engine is judged to be connected to the transmission.

After the torque phase has ended, inertia phase process 1 that is step TS4 of FIG. 3 is performed when the motor 11 can regenerate the maximum usable amount of energy and is not power-limited.

In inertia phase process 1, as in torque phase process 1, the motor torque Tm is determined first and then the braking torque is determined from the determined motor torque. However, the torque needs to be determined considering an inertia torque, since the gear shift is already in the inertial phase.

In steps S200 and S201 of FIG. 12, the HCM 100 determines the motor torque Tm and the transmission input torque Ttrin. This is performed in essentially the same manner as used in torque phase process 1 of step TS2.

Next, in step S400, the HCM 100 analyzes progress of the inertia phase. At a time of entry into the inertia phase (i.e., at the time t2 in FIG. 13), an inertia phase flag f_Inephase is set to "1". In this example, target inertia torque determined from the increment of the input shaft rotational speed in the inertia phase is defined as Tinet. When the inertia torque Tine exceeds the target inertia torque (Tine>Tinet) at time t3 in section (B) of FIG. 14, the setting of the inertia phase flag f_Inephase is changed to "2" to indicate that sufficient inertia has been successfully achieved. The inertia torque Tine is the same as the target value Tinet (i.e., Tine=Tinet). After that, the shift state further progresses and at time t4 in FIG. 14, a difference between the after-shifting transmission shaft rotational speed Ntrin2 and the input shaft rotational speed Ntrin becomes smaller than an inertia phase termination threshold (Ntrthinefin) (i.e., Ntrthinefin>>Ntrin2−Ntrin), the setting of the inertia phase flag f_Inephase is changed to "3" to indicate that the inertia phase is essentially drawing to an end. The inertia torque Tine at this time is gradually reduced by multiplying the speed difference by a gain (Tine=(Ntrin2−Ntrin)×Kpine) so that the shift is completed smoothly.

While the setting of "1" of the inertia phase flag f_Inephase is effective, clutch torque data is calculated in essentially the same way as in steps S204 and S205 of torque phase process 1. When the setting of the inertia phase flag f_Inephase is changed to "2", steps S401 and S402 are executed for the HCM 100 to control the torque capacity Tcl2 of the after-shifting clutch 23 as (Tcl2=|Ttrin|+Tine+Tcl1). This ensures the inertia torque Tine with the torque capacity Tcl1 of the before-shifting clutch 22 left intact, that is, Tcl1=Tcl1 (previous value). When the setting of the inertia phase flag f_Inephase is changed to "3", since the inertia phase is essentially drawing to an end, the torque capacity Tcl1 of the before-shifting clutch 22 is controlled as (Tcl1=Tcl2−(|Ttrin|+Tine/G5) in steps S403 and S404 to achieve gradually decreasing inertia torque with the torque capacity Tcl2 of the after-shifting clutch 23 left intact, that is, Tcl2=Tcl2 (previous value).

After that, in steps S206, S405, S208, S209, and S210, the HCM 100 calculates the transmission output shaft torque Ttrout in essentially the same manner as used in torque phase process 1 of FIG. 8, and then calculates the braking torque Tb by subtracting the calculated value from the transmission output shaft equivalent driver-requested braking torque Ttrreq. In the inertia phase, however, since the before-shifting clutch 22 enters a slipping state, step S207 in which the transmission output shaft equivalent torque Ttrout1 transmitted via the before-shifting clutch 22 is to be calculated is replaced by step S405 of FIG. 12 and Ttrout1 is calculated as (Ttrout1=−Tcl1×G5).

Details of the control process in inertia phase process 1 are described below using FIG. 13. Control in torque phase process 1 of step TS2 occurs during the time from t1 to t2 in FIG. 13, and control in inertia phase process 1 of step TS4 occurs during the time from t2 to t5. (Tinetr is added in FIG. 13.)

In section (B) of FIG. 13, Tetr is the engine torque, that is, the transmission output shaft equivalent value of the engine brake torque (Tetr=Ttrout×(Te×Ge/(Tine+Te×Ge+Tm×Gm))). Also, Tmtr is the motor torque, that is, the transmission output shaft equivalent value of the motor regenerative torque (Tmtr=Ttrout×(Tm×Gm/(Tine+Te×Ge+Tm×Gm))). In addition, Tinetr is the transmission output shaft equivalent value of the inertia torque (Tinetr=Ttrout×(Tine/(Tine+Te×Ge+Tm×Gm))). Furthermore, Tbtr is the transmission output shaft equivalent braking torque value of the brake. Moreover, Ttrreq is the driver-requested braking torque, that is, the transmission output shaft equivalent value of the total braking force. The transmission output shaft equivalent value Tmtr of the motor regenerative torque and the transmission output shaft equivalent braking torque value Tbtr of the brake are distributed according to the particular transmission output shaft equivalent value Tinetr of the inertia torque so that the total braking force value obtained by summing up the transmission output shaft equivalent value Tetr of the engine brake torque, the transmission output shaft equivalent value Tmtr of the motor regenerative torque, the transmission output shaft equivalent inertia torque value Tinetr, and the transmission output shaft equivalent braking torque value Tbtr of the brake matches the transmission output shaft equivalent driver-requested braking torque Ttrreq equivalent to the total braking force target value.

As described above, the torque phase process occurs during the time from t1 to t2. As shown in section (A) of FIG. 13, the inertia phase begins at the time t2 so that the input shaft rotational speed changes from the shaft rotational speed Ntrin of the transmission input shaft 20IN or the transmission input shaft equivalent before-shifting shaft rotational speed Ntrin1 to the transmission input shaft equivalent after-shifting shaft rotational speed Ntrin2.

At the time t2, the inertia torque Tinetr gradually increases as shown in section (B) of FIG. 13. The control steps executed from the time t2 to the time t3 are the same as steps S204 and S205 of torque phase process 1. As shown in section (C) of FIG. 13, therefore, the value of the torque capacity Tcl1 of the before-shifting clutch 22 decreases at the same decrease rate as before the time t2, and the value of the torque capacity Tcl2 of the after-shifting clutch 23 increases at the same increase rate as before the time t2.

As shown in section (B) of FIG. 13, in the process of steps S206 to S210 from the time t2 to the time t3, as the transmission output shaft equivalent value Tinetr of the inertia torque increases, the transmission output shaft equivalent braking torque value Tbtr is correspondingly reduced, whereby the transmission output shaft equivalent driver-requested braking torque Ttrreq is maintained to reduce braking shocks.

When the inertia torque Tine exceeds the inertia target torque Tinet at the time t3, the setting of the inertia phase flag f_Inephase is changed to "2". Next in the process of steps S401 and S402, the previous value of the torque capacity Tcl1 of the before-shifting clutch 22 is maintained and the torque capacity Tcl2 of the after-shifting clutch 23 is controlled to ensure the inertia torque.

In the process of steps S206 to S210 from the time t3 to the time t4, the transmission output shaft equivalent braking torque value Tbtr is also reduced according to the particular inertia torque Tine. Thus, the transmission output shaft equivalent driver-requested braking torque Ttrreq is maintained to reduce braking shocks.

As shown in section (A) of FIG. 13, when the difference between the after-shifting shaft rotational speed Ntrin2 and the input shaft rotational speed Ntrin becomes smaller than the inertia phase termination threshold (Ntrthinefin) at the time t4, the setting of the inertia phase flag f_Inephase is changed to "3". Next in the process of steps S403 and S404, as shown in section (C) of FIG. 13, the torque capacity Tcl1 of the before-shifting clutch 22 is increased with the torque capacity Tcl2 of the after-shifting clutch 23 remaining intact. Thus as shown in section (B) of FIG. 13, the transmission output shaft equivalent value Tinetr of the inertia torque is gradually reduced for smooth completion of the gear shift.

When the vehicle is controlled in this way, the amount of energy regeneration in the motor is maximized and the braking torque is determined allowing for the inertia toque, so in the inertia phase, the occurrence of braking shocks can also be prevented while maximizing the amount of energy regenerated.

In the case that the engine is not connected to the transmission, engine torque Te=0 is set in step S5 of FIG. 3. The transmission output shaft equivalent engine torque Tetr in section (B) of FIG. 13, therefore, becomes 0. In this case, the occurrence of braking shocks can also be prevented while maximizing the amount of energy regenerated.

The case that the engine is not connected to the transmission refers to a case in which the hybrid vehicle is running in EV mode. In electric vehicles, however, only the motor is connected to the transmission, so in this case, the occurrence of braking shocks can also be prevented while maximizing the amount of energy regenerated.

Details of the control process in step TS5 (inertia phase process 2) of FIG. 3 are described below using FIGS. 14 and 15.

Figure 14:
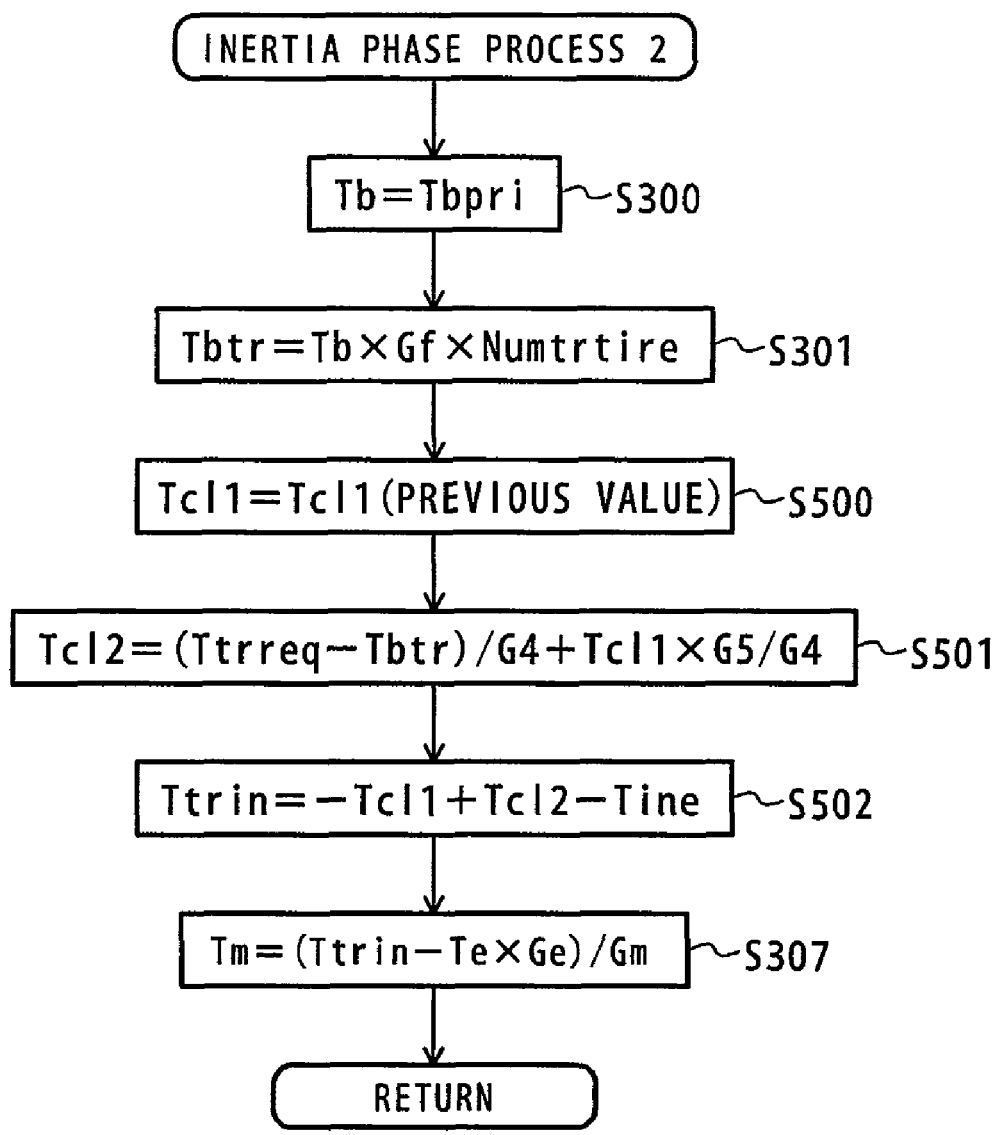
FIG. 14 is a flowchart that shows a process flow of inertia phase process 2 in the vehicle control apparatus of the present embodiment.

FIG. 14 is a flowchart that shows a process flow of inertia phase process 2 in the vehicle control apparatus of the present embodiment. FIG. 15 is a timing chart that shows details of control in inertia phase process 2 by the vehicle control apparatus of the present embodiment.

Figure 15:
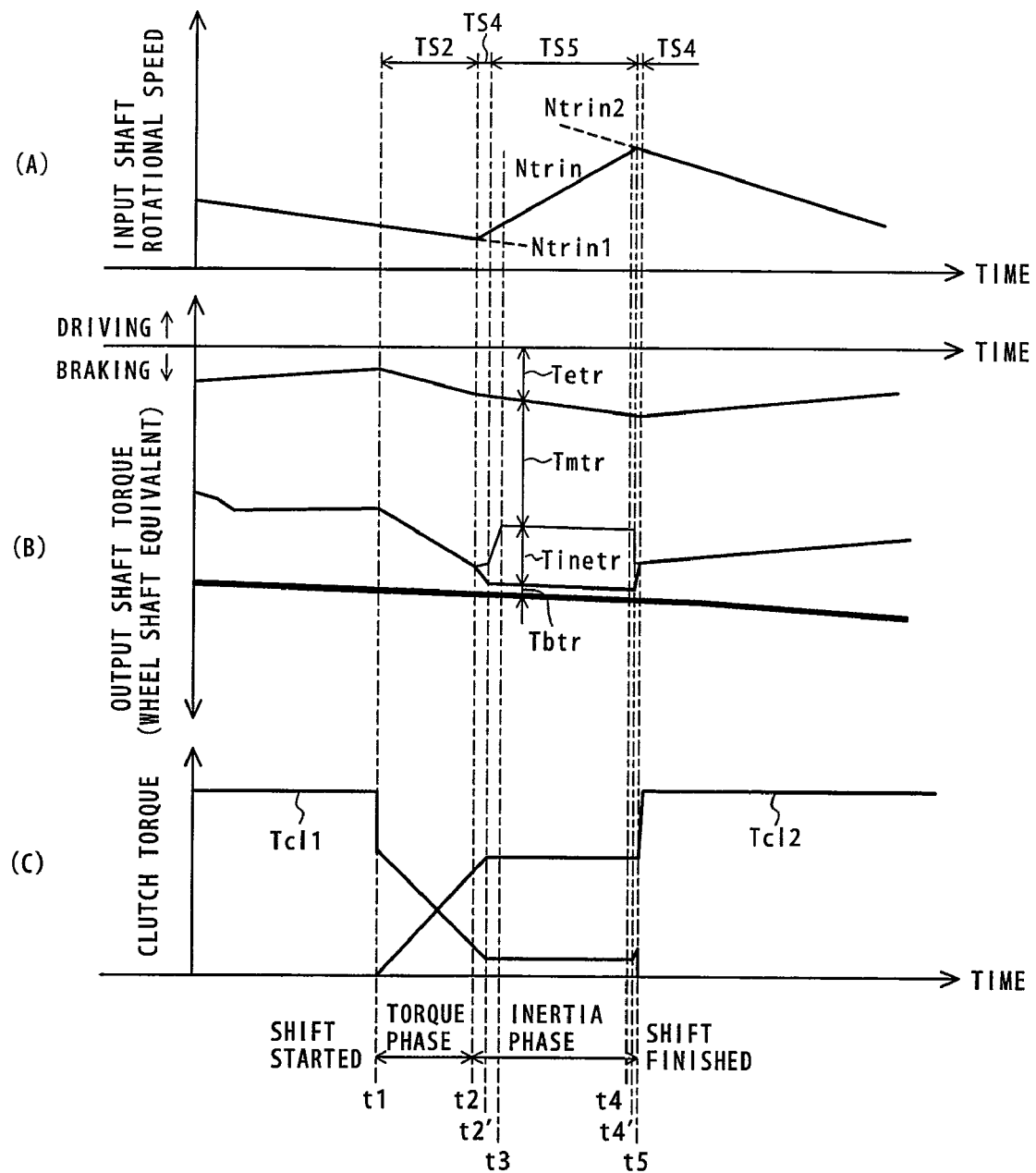
FIG. 15 is a timing chart that shows details of control in inertia phase process 2 by the vehicle control apparatus of the present embodiment.

A horizontal axis in FIG. 15 denotes time. Section (A) of FIG. 15 denotes the input shaft rotational speed, section (B) of FIG. 15 denotes the torque distribution expressed in output shaft torque, and section (C) of FIG. 15 denotes the clutch torque.

A downshift from the fifth gear to the fourth gear is taken as an example in the description given below. Also, the process here assumes that in step S3 of FIG. 3, the engine is judged to be connected to the transmission.

After the torque phase has ended, inertia phase process 2 that is step TS5 of FIG. 3 is performed when the motor 11 cannot regenerate the maximum usable amount of energy.

As shown in FIG. 14, inertia phase process 2 is a step in which, as in torque phase process 2, the braking torque Tb is determined, then the clutch torques Tcl1, Tcl2 are calculated, and the motor regenerative torque Tm is determined.

In steps S300 and S301 of FIG. 14, the HCM 100 functions essentially the same as in torque phase process 2, and the minimum braking torque Tbpri determined allowing for the characteristics of the brake 15 is assigned as the braking torque Tb.

Next, in steps S500 and S501, the HCM 100 controls clutch torque calculation to obtain Tcl2=(Ttrreq−Tbtr)/G4+Tcl1× G5/G4 so that the clutch torque Tcl2 satisfies the driver-requested braking torque Ttrreq with the clutch torque Tcl1 maintained at its current value, that is, with Tcl1=Tcl1 (previous value).

(Inertial phase 2 is corrected, as with torque phase 2 (Tmtr definition error).) In next step S502, the HCM 100 allows for the inertia torque Tine and calculates the transmission input shaft torque Ttrin so that Ttrin=Tcl1+Tcl2−Tine. Also, the HCM 100 calculates the motor torque Tm in step S307 similarly to TS3 that is torque phase process 2.

Details of the control process in inertia phase process 2 are described below using FIG. 15. Control in torque phase process 1 of step TS2 occurs during the time from t1 to t2 in FIG. 15, control in inertia phase process 1 of step TS4 occurs during the time from t2 to t2' and during the time from t4' to t5, and control in inertia phase process 2 of step TS5 occurs during the time from t2' to t4'.

As described above, the torque phase process occurs during the time from t1 to t2. As shown in section (A) of FIG. 13, the inertia phase begins at the time t2 so that the input shaft rotational speed changes from the shaft rotational speed Ntrin of the transmission input shaft 20IN or the transmission input shaft equivalent before-shifting shaft rotational speed Ntrin1 to the transmission input shaft equivalent after-shifting shaft rotational speed Ntrin2.

At the time t2, the inertia torque Tine gradually increases as shown in section (B) of FIG. 15. The control steps executed from the time t2 to the time t2' are the same as steps S204 and S205 of torque phase process 1. As shown in section (C) of FIG. 15, therefore, the value of the torque capacity Tcl1 of the before-shifting clutch 22 decreases at the same decrease rate as before the time t2, and the value of the torque capacity Tcl2 of the after-shifting clutch 23 increases at the same increase rate as before the time t2.

When it is judged at the time t2' that no more regenerative braking torque can be developed, control is transferred to inertia phase process 2 of step TS5 in FIG. 3. At the time t2' to t4', the braking torque Tb is assigned as the braking priority torque Tbpri (minimum braking torque) by the execution of steps S300 and S301 in FIG. 14, so the transmission output shaft equivalent braking torque Tbtr is also fixed at its minimum value. Next in the process of steps S500 and S501, as shown in section (C) of FIG. 13, the previous value of the torque capacity Tcl1 of the before-shifting clutch 22 is maintained and the torque capacity Tcl2 of the after-shifting clutch 23 is controlled to ensure the inertia torque.

In the process of steps S502 to S307, the motor torque Tm is reduced according to the particular inertia torque Tine. Thus, the transmission output shaft equivalent driver-requested braking torque Ttrreq is maintained to reduce braking shocks. The braking torque Tb distributed is controlled to the minimum value determined from the brake characteristics. This allows the amount of regeneration of the motor torque Tm to be maximized and thus the amount of regeneration to be increased.

As described above, since the torque is distributed allowing for the inertia torque, braking shocks due to excess of the transmission output shaft equivalent driver-requested braking torque Ttrreq can be reduced. In addition, the braking torque Tb distributed is controlled to the minimum value determined from the brake characteristics. This allows the amount of regeneration of the motor torque Tm to be maximized with the inertia torque taken into account, and thus the amount of regeneration to be increased.

In the case that the engine is not connected to the transmission, engine torque Te=0 is set in step S5 of FIG. 3. The transmission output shaft equivalent engine torque Tetr in section (B) of FIG. 15, therefore, becomes 0. In this case, the occurrence of braking shocks can also be prevented with the inertia torque taken into account, while maximizing the amount of energy regenerated.

The case that the engine is not connected to the transmission refers to a case in which the hybrid vehicle is running in EV mode. In electric vehicles, however, only the motor is connected to the transmission, so in this case, the occurrence of braking shocks can also be prevented with the inertia torque taken into account, while maximizing the amount of energy regenerated.

Details of the control process in step TS6 (inertia phase process 3) of FIG. 3 are described below using FIGS. 16 and 17.

Figure 16:
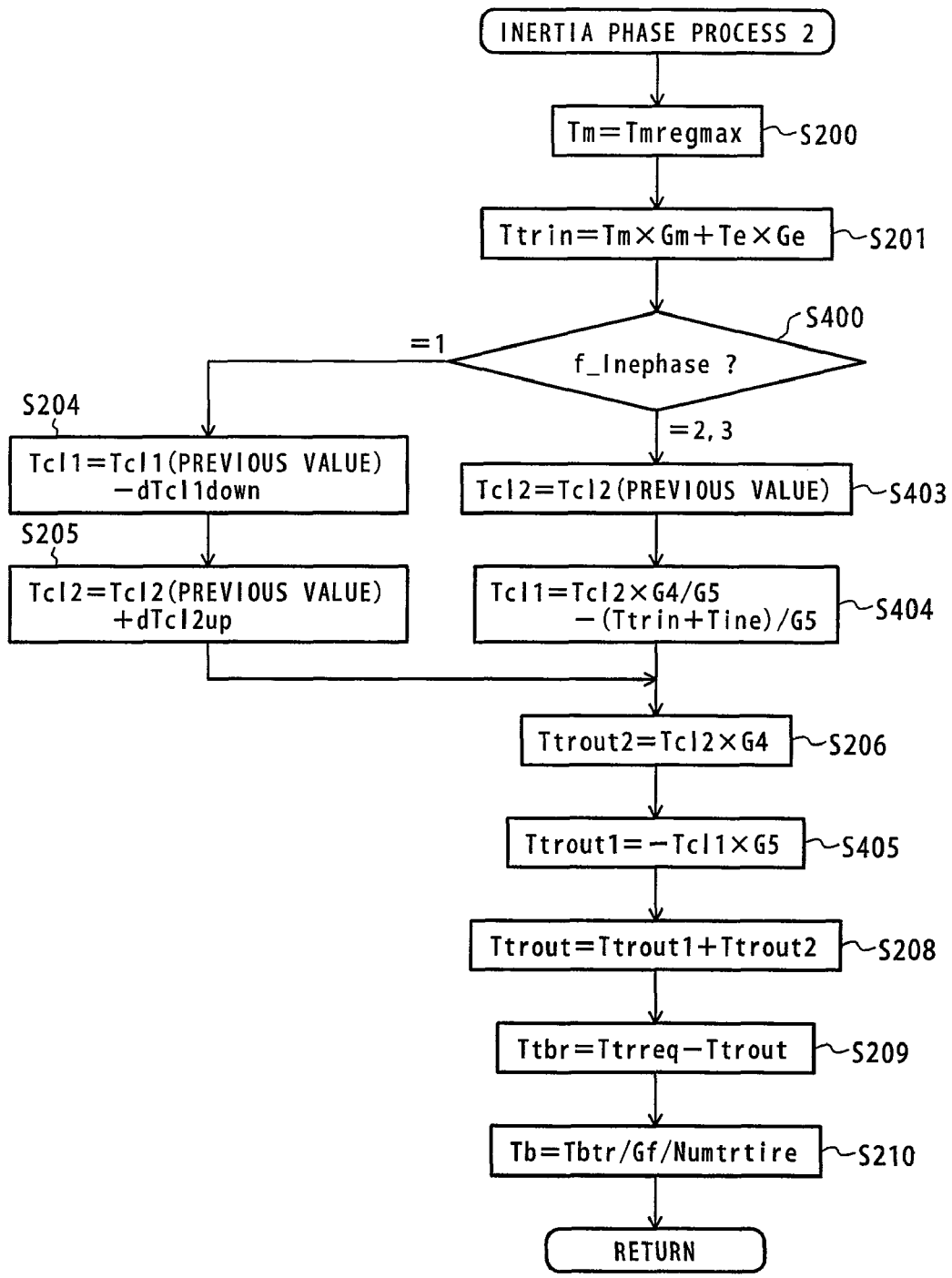
FIG. 16 is a flowchart that shows a process flow of inertia phase process 3 in the vehicle control apparatus of the present embodiment.

FIG. 16 is a flowchart that shows a process flow of inertia phase process 3 in the vehicle control apparatus of the present embodiment. FIG. 17 is a timing chart that shows details of control in inertia phase process 3 by the vehicle control apparatus of the present embodiment.

A horizontal axis in FIG. 17 denotes time. Section (A) of FIG. 17 denotes the input shaft rotational speed, section (B) of FIG. 17 denotes the torque distribution expressed in output shaft torque, and section (C) of FIG. 17 denotes the clutch torque.

A downshift from the fifth gear to the fourth gear is taken as an example in the description given below. Also, the process here assumes that in step S3 of FIG. 3, the engine is judged to be connected to the transmission.

After the torque phase has ended, inertia phase process 3 that is step TS6 of FIG. 3 is performed when the motor 11 can regenerate the maximum usable amount of energy and is power-limited.

When the power limits are effective, as shown in FIG. 5, the motor torque decreases significantly with increases in motor rotational speed. When the after-shifting clutch torque Tcl2 is used to compensate for the decrease in the motor torque, since a certain degree of torque is present, the compensation is liable to occur at where great torque response hysteresis exists. In this case, even if operations are intended to have been performed so as to reduce the clutch torque in proper timing for the decrease in the motor torque, the clutch torque will actually not decrease and a braking shock will result. For this reason, the compensation is performed using the before-shifting clutch torque Tcl1 whose value is nearly 0 and which minimizes the hysteresis.

In FIG. 16, the same step numbers as in FIG. 12 denote the same process steps. The process in FIG. 16 differs from that of FIG. 12 in that even when the setting of the inertia phase flag f_Inephase is "2", control is performed using the same steps S403 and S404 as used when the setting of the inertia phase flag f_Inephase is "3". In other words, irrespective of whether the setting of the inertia phase flag f_Inephase is "2" or "3", the before-shifting clutch torque Tcl1 is used in both cases to compensate for any decreases in motor torque.

Details of the control process in inertia phase process 3 are described below using FIG. 17. Control in torque phase process 1 of step TS2 occurs during the time from t1 to t2 in FIG. 17, and control in inertia phase process 3 of step TS6 occurs during the time from t2 to t5.

As described above, the torque phase process occurs during the time from t1 to t2. As shown in section (A) of FIG. 13, the inertia phase is started at the time t2 so that the input shaft rotational speed changes from the shaft rotational speed Ntrin of the transmission input shaft 20IN or the transmission input shaft equivalent before-shifting shaft rotational speed Ntrin1 to the transmission input shaft equivalent after-shifting shaft rotational speed Ntrin2.

At the time t2, the transmission output shaft equivalent value Tinetr of the inertia torque gradually increases as shown in section (B) of FIG. 17. The control steps executed from the time t2 to the time t3 are the same as steps S204 and S205 of torque phase process 1. As shown in section (C) of FIG. 17, therefore, the value of the torque capacity Tcl1 of the before-shifting clutch 22 decreases at the same decrease rate as before the time t2, and the torque capacity Tcl2 of the after-shifting clutch 23 increases at the same increase rate as before the time t2.

As shown in section (B) of FIG. 17, in the process of steps S206 to S210 from the time t2 to the time t3, as the inertia torque Tine increases, the transmission output shaft equivalent braking torque value Tbtr is correspondingly reduced, whereby the transmission output shaft equivalent driver-requested braking torque Ttrreq is maintained to reduce braking shocks.

When the inertia torque Tine shown in section (B) of FIG. 17 exceeds the inertia target torque Tinet at the time t3, the setting of the inertia phase flag f_Inephase is changed to "2". Next in the process of steps S403 and S404, the torque capacity Tcl2 of the after-shifting clutch 23 is maintained and the torque capacity Tcl1 of the before-shifting clutch 22 is increased as shown in section (C) of FIG. 17. As the motor power limits increase the motor rotational speed, the motor torque Tmtr decreases and this decrease is compensated for by the braking torque Tbtr.

As shown in section (A) of FIG. 17, when the difference between the after-shifting shaft rotational speed Ntrin2 and the input shaft rotational speed Ntrin becomes smaller than the inertia phase termination threshold (Ntrthinefin) at the time t4, the setting of the inertia phase flag f_Inephase is changed to "3". Next in the process of steps S403 and S404, as shown in section (C) of FIG. 17, the torque capacity Tcl1 of the before-shifting clutch 22 is increased with the torque capacity Tcl2 of the after-shifting clutch 23 remaining intact. Thus as shown in section (B) of FIG. 13, the transmission output shaft equivalent value Tinetr of the inertia torque is gradually reduced for smooth completion of the gear shift.

Under the above vehicle control, even when the motor is power-limited and the motor torque changes significantly, braking shocks can be reduced while maximizing the amount of energy regenerated.

In the case that the engine is not connected to the transmission, engine torque Te=0 is set in step S5 of FIG. 3. The transmission output shaft equivalent engine torque Tetr in section (B) of FIG. 17, therefore, becomes 0. In this case, the occurrence of braking shocks can also be prevented since the amount of energy regenerated can be maximized considering the inertia torque.

The case that the engine is not connected to the transmission refers to a case in which the hybrid vehicle is running in EV mode. In electric vehicles, however, only the motor is connected to the transmission, so in this case, the occurrence of braking shocks can also be prevented since the amount of energy regenerated can be maximized considering the inertia torque.

While it has been described above that the present embodiment employs a dual-clutch type of AMT as the automated multi-stage transmission 20, an automatic transmission (AT) may be selected that employs a planetary gear train instead. For the AT, the planetary gear train has clutches connected to either of its ring gear, carrier, or sun gear, and a plurality of shift gear ratios are realized by combining clutch engagement/disengagement states. During shifting, control in the present embodiment can be applied intact since, as in the dual-clutch type, one clutch can be engaged while the other clutch is being disengaged.

In addition, while the dual-clutch AMT in FIG. 2 has been taken as an example of the multi-stage transmission 20, since the control function of the present embodiment can be realized in any transmission configured to allow shifting under a torque-transmitting state by clutch switching, the embodiment does not limit the configuration to that of FIG. 2 and the content of the invention encompasses other configurations as well.

Furthermore, while the present embodiment has been described above, the embodiment does not limit a more specific configuration and the present invention embraces any modifications/changes and additions performed without departing from the scope of the invention.

As set forth above, the present embodiment controls the vehicle so as to minimize changes in braking force while ensuring the amount of energy regenerated. In the torque phase, for example, torque distribution occurs so that the braking torque of the wheel-mounted brake is reduced in response to a rise in regenerative torque due to clutch torque switching. In the inertia phase, torque distribution occurs so that the braking torque is reduced in response to an increase in torque due to inertia.

Additionally, whether the maximization of the amount of regeneration results in the driver-requested torque being exceeded is judged and when this torque is exceeded, torque distribution occurs so that the amount of energy regenerated by the motor will decrease according to the particular excess of the torque.

Furthermore, in the inertia phase, when the motor is power-limited, torque distribution uses the before-shifting clutch since adjustment with the after-shifting clutch results in torque distribution being controlled in a hysteresis region of the clutch torque.

Controlling torque distribution in this way allows a maximum amount of energy to be regenerated while the total amount of braking torque distributed always satisfies the driver-requested braking torque. During deceleration downshift control, therefore, braking shocks can be reduced. The amount of energy regenerated can also be increased.

What is claimed is:

1. A vehicle control apparatus for a motor vehicle which includes wheels, a motor, a brake, and a multi-stage transmission, and transmits a torque of the motor to the wheels via the multi-stage transmission, the control apparatus being adapted to control a braking force of the vehicle by using a braking torque of the motor and a braking torque of the brake, the control apparatus comprising:
   gear shift control means which performs a gear shift of the multi-stage transmission according to a particular state of the vehicle; and
   torque distribution control means which controls distribution of the braking torques of the motor and the brake;
   wherein when downshift control is selected by said gear shift control means, the distribution of the torques is controlled to obtain target braking force of the vehicle, the target braking force of the vehicle being determined from a state of the vehicle and operations of a driver.

2. The vehicle control apparatus according to claim 1, wherein:
   during a torque phase of the downshift, even when the motor develops a maximum achievable braking torque, when the target braking force of the vehicle is judged to be achievable, the control of the torque distribution changes the braking torque of the brake according to a particular change in the motor braking torque expressed in transmission output shaft torque, in order that a total braking force of the vehicle matches the target braking force thereof.

3. The vehicle control apparatus according to claim 1, wherein:
   the vehicle further includes an engine and transmits a torque of the engine to the wheels via the multi-stage transmission; and
   during a torque phase of the downshift, even when the motor develops a maximum achievable braking torque, when the target braking force of the vehicle is judged to be achievable, the control of the torque distribution changes the braking torque of the brake according to particular changes in the engine brake torque and motor braking torque which are expressed in transmission output shaft torque, in order that a total braking force of the vehicle matches the target braking force thereof.

4. The vehicle control apparatus according to claim 1, wherein:
   during a torque phase of the downshift, when the motor develops a maximum achievable braking torque and the target braking force of the vehicle is judged to be unachievable, the control of the torque distribution is adapted to minimize the braking torque of the brake and to change the braking torque of the motor such that a total braking force of the vehicle matches the target braking force thereof.

5. The vehicle control apparatus according to claim 1, wherein:
the vehicle further includes an engine and transmits a torque of the engine to the wheels via the multi-stage transmission; and
during a torque phase of the downshift, when the motor develops a maximum achievable braking torque and the target braking force of the vehicle is judged to be unachievable, the control of the torque distribution is adapted to minimize the braking torque of the brake and to change the braking torque of the motor according to a particular change in the engine brake torque of the engine such that a total braking force of the vehicle matches the target braking force thereof.

6. The vehicle control apparatus according to claim 1, wherein:
during an inertia phase of the downshift, even when the motor develops a maximum achievable braking torque, when the target braking force of the vehicle is judged to be achievable, the control of the torque distribution changes the braking torque of the brake according to a change in inertia torque which is caused by a change in motor rotational speed as well as a particular change in the motor braking torque which is expressed in transmission output shaft torque, in order that a total braking force of the vehicle matches the target braking force thereof.

7. The vehicle control apparatus according to claim 1, wherein:
the vehicle further includes an engine and transmits a torque of the engine to the wheels via the multi-stage transmission; and
during an inertia phase of the downshift, even when the motor develops a maximum achievable braking torque, when the target braking force of the vehicle is judged to be achievable, the control of the torque distribution changes the braking torque of the brake according to a change in inertia torque which is caused by a change in motor rotational speed as well as particular changes in the engine brake torque and motor braking torque which are expressed in transmission output shaft torque, in order that a total braking force of the vehicle matches the target braking force thereof.

8. The vehicle control apparatus according to claim 1, wherein:
during an inertia phase of the downshift, even when the motor develops a maximum achievable braking torque, when the target braking force of the vehicle is judged to be achievable, the control of the torque distribution is adapted to minimize the braking torque of the brake and to change the braking torque of the motor according to a change in inertia torque which is caused by a change in motor rotational speed, in order that a total braking force of the vehicle matches the target braking force thereof.

9. The vehicle control apparatus according to claim 1, wherein:
the vehicle further includes an engine and transmits a torque of the engine to the wheels via the multi-stage transmission; and
during an inertia phase of the downshift, even when the motor develops a maximum achievable braking torque, when the target braking force of the vehicle is judged to be achievable, the control of the torque distribution is adapted to minimize the braking torque of the brake and to change the braking torque of the motor according to a change in inertia torque which is caused by a change in motor rotational speed as well as particular changes in the engine brake torque, in order that a total braking force of the vehicle matches the target braking force thereof.

10. The vehicle control apparatus according to claim 1, wherein, during an inertia phase of the downshift, even when the motor develops a maximum achievable braking torque, when the target braking force of the vehicle is judged to be achievable and the maximum achievable braking torque is power-limited, the control of the torque distribution is adapted to:
control a clutch-engaging force (torque capacity) of a clutch within the multi-stage transmission according to a particular decrease in the braking torque of the motor due to the power limit; and
change the braking torque of the brake according to a change in inertia torque which is caused by a change in motor rotational speed as well as a particular change in the motor braking torque which is expressed in transmission output shaft torque, such that a total braking force of the vehicle matches the target braking force thereof.

11. The vehicle control apparatus according to claim 1, wherein:
the vehicle further includes an engine and transmits a torque of the engine to the wheels via the multi-stage transmission; and
during an inertia phase of the downshift, even when the motor develops a maximum achievable braking torque, when the target braking force of the vehicle is judged to be achievable and the maximum achievable braking torque is power-limited, the control of the torque distribution is adapted to
control a clutch-engaging force (torque capacity) of a clutch within the multi-stage transmission according to a particular decrease in the braking torque of the motor due to the power limit, and
change the braking torque of the brake according to a change in inertia torque which is caused by a change in motor rotational speed as well as a particular change in the engine brake torque and motor braking torque which are expressed in transmission output shaft torque, in order that a total braking force of the vehicle matches the target braking force thereof.

12. A motor vehicle comprising, in addition to wheels, a brake, a multi-stage transmission, and a motor connecting to the wheels via the multi-stage transmission, a vehicle control apparatus which controls a braking force of the vehicle by using a braking torque of the motor and a braking torque of the brake, the vehicle control apparatus including:
gear shift control means which performs a gear shift of the multi-stage transmission according to a particular state of the vehicle; and
torque distribution control means which controls distribution of the braking torques of the motor and the brake;
wherein, when downshift control is selected by said gear shift control means, the distribution of the torques is controlled to obtain a target braking force of the vehicle which is determined by the state of the vehicle and operations of a driver.

* * * * *